US011575537B2

(12) United States Patent
Scalisi

(10) Patent No.: US 11,575,537 B2
(45) Date of Patent: Feb. 7, 2023

(54) DOORBELL COMMUNICATION SYSTEMS AND METHODS

(71) Applicant: SKYBELL TECHNOLOGIES IP, LLC, Irvine, CA (US)

(72) Inventor: Joseph Frank Scalisi, Yorba Linda, CA (US)

(73) Assignee: SkyBell Technologies IP, LLC, Irvine, CA (US)

( * ) Notice: Subject to any disclaimer, the term of this patent is extended or adjusted under 35 U.S.C. 154(b) by 0 days.

(21) Appl. No.: 16/915,977

(22) Filed: Jun. 29, 2020

(65) Prior Publication Data

US 2020/0336331 A1 Oct. 22, 2020

Related U.S. Application Data

(63) Continuation of application No. 15/719,543, filed on Sep. 28, 2017, now abandoned, which is a (Continued)

(51) Int. Cl.
*H04L 12/28* (2006.01)
*H04N 7/18* (2006.01)
(Continued)

(52) U.S. Cl.
CPC ............ *H04L 12/2827* (2013.01); *G07C 9/00* (2013.01); *G07C 9/00571* (2013.01);
(Continued)

(58) Field of Classification Search
CPC ............. H04L 12/2827; H04L 12/2818; H04L 12/2825; H04L 12/40169; H04L 12/4625;
(Continued)

(56) References Cited

U.S. PATENT DOCUMENTS 1,647,558 A 11/1927 Best
1,647,708 A 11/1927 Monica
(Continued)

FOREIGN PATENT DOCUMENTS

CN 2131143 Y 4/1993
CN 1704985 A 12/2005
(Continued)

OTHER PUBLICATIONS

Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
(Continued)

*Primary Examiner* — Joseph W Becker
(74) *Attorney, Agent, or Firm* — Gallium Law; Wesley Schwie, Esq.; Isabel Fox

(57) ABSTRACT

The disclosure includes a method for using a doorbell system to detect a presence of a visitor. The doorbell system can comprise a doorbell having a speaker, a microphone, a camera, and a button. The method can include detecting, by the doorbell system, the presence of the visitor while the visitor is located outside a building to which the doorbell is attached. The building can include a door having a lock that is configured to fasten the door to inhibit unauthorized entry into the building. In response to detecting the presence of the visitor, the method can include the step of actuating, by the doorbell system, a first appliance associated with the building.

20 Claims, 13 Drawing Sheets

Related U.S. Application Data continuation-in-part of application No. 15/615,818, filed on Jun. 6, 2017, now Pat. No. 9,997,036, which is a continuation-in-part of application No. 15/292,019, filed on Oct. 12, 2016, now abandoned, which is a continuation-in-part of application No. 14/861,613, filed on Sep. 22, 2015, now Pat. No. 10,044,519, which is a continuation-in-part of application No. 14/728,975, filed on Jun. 2, 2015, now Pat. No. 10,062,251.

(60) Provisional application No. 62/221,489, filed on Sep. 21, 2015, provisional application No. 62/139,497, filed on Mar. 27, 2015.

(51) Int. Cl.
```
H04M 3/42      (2006.01)
H04M 11/02     (2006.01)
G07C 9/00      (2020.01)
G08B 13/196    (2006.01)
H04N 7/14      (2006.01)
G08B 15/00     (2006.01)
G08B 3/10      (2006.01)
H04L 12/46     (2006.01)
H04M 11/04     (2006.01)
H04L 12/40     (2006.01)
H04N 5/232     (2006.01)
G08B 25/00     (2006.01)
H04N 5/14      (2006.01)
G06V 40/70     (2022.01)
```

(52) U.S. Cl.
CPC .......... *G07C 9/00904* (2013.01); *G08B 3/10* (2013.01); *G08B 15/00* (2013.01); *H04L 12/2818* (2013.01); *H04L 12/2825* (2013.01); *H04L 12/40169* (2013.01); *H04L 12/4625* (2013.01); *H04M 3/42348* (2013.01); *H04M 11/025* (2013.01); *H04M 11/04* (2013.01); *H04N 7/185* (2013.01); *H04N 7/186* (2013.01); *G06V 40/70* (2022.01); *G08B 13/1966* (2013.01); *G08B 13/19619* (2013.01); *G08B 13/19684* (2013.01); *G08B 13/19695* (2013.01); *G08B 25/009* (2013.01); *H04L 2012/2841* (2013.01); *H04L 2012/2849* (2013.01); *H04N 5/144* (2013.01); *H04N 5/23296* (2013.01)

(58) Field of Classification Search
CPC .... H04L 2012/2841; H04L 2012/2849; G07C 9/00; G07C 9/00571; G07C 9/00904; G08B 3/10; G08B 15/00; G08B 13/19619; G08B 13/1966; G08B 13/19684; G08B 13/19695; G08B 25/009; H04M 3/42348; H04M 11/025; H04M 11/04; H04N 7/185; H04N 7/186; H04N 5/144; H04N 5/23296; G06V 40/70
See application file for complete search history.

(56) References Cited

U.S. PATENT DOCUMENTS

| | | |
|---|---|---|
| 3,240,113 A | 3/1966 | Stechemesser |
| 3,708,742 A | 1/1973 | Gunn |
| 4,523,193 A | 6/1985 | Levinson |
| D283,130 S | 3/1986 | Boenning |
| D297,222 S | 8/1988 | Rauch |
| 4,843,461 A | 6/1989 | Tatsumi |
| 4,982,092 A | 1/1991 | Jehle |
| 5,210,520 A | 5/1993 | Housley |
| 5,428,388 A | 6/1995 | Von Bauer |
| 5,493,618 A | 2/1996 | Stevens |
| 5,521,578 A | 5/1996 | Delvalle |
| D371,086 S | 6/1996 | Collins |
| 5,602,580 A | 2/1997 | Tseng |
| D381,638 S | 7/1997 | Kruse |
| 5,774,569 A | 6/1998 | Waldenmaier |
| 5,781,108 A | 7/1998 | Jacob |
| 5,784,446 A | 7/1998 | Stuart |
| D404,673 S | 1/1999 | Gordon |
| 5,907,352 A | 5/1999 | Gilley |
| 5,995,139 A | 11/1999 | Lee |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,313,743 B1 | 11/2001 | Abraham-Fuchs |
| 6,375,366 B1 | 4/2002 | Kato |
| 6,414,589 B1 | 7/2002 | Angott |
| 6,429,893 B1 | 8/2002 | Xin |
| 6,535,243 B1 | 3/2003 | Tullis |
| 6,542,078 B2 | 4/2003 | Script |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| 6,812,970 B1 | 11/2004 | McBride |
| 6,828,909 B2 | 12/2004 | Script |
| D500,751 S | 1/2005 | Yukikado |
| D501,652 S | 2/2005 | Pierson |
| 6,870,488 B1 | 3/2005 | Compton |
| 6,928,461 B2 | 8/2005 | Tuli |
| 6,930,599 B2 | 8/2005 | Naidoo |
| 6,993,123 B1 | 1/2006 | Allen |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,154,531 B2 | 12/2006 | Laird |
| 7,193,644 B2 | 3/2007 | Carter |
| 7,218,220 B1 | 5/2007 | Bovsun |
| D562,306 S | 2/2008 | Jeong |
| 7,330,112 B1 | 2/2008 | Emigh |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,440,025 B2 | 10/2008 | Cheng |
| 7,460,149 B1 | 12/2008 | Donovan |
| 7,477,134 B2 | 1/2009 | Langer |
| 7,486,271 B2 | 2/2009 | Hershkovitz |
| 7,492,303 B1 | 2/2009 | Levitan |
| D588,574 S | 3/2009 | Takahata |
| 7,526,102 B2 | 4/2009 | Ozer |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,751,285 B1 | 7/2010 | Cain |
| 7,752,070 B2 | 7/2010 | Hatcher |
| 7,809,966 B2 | 10/2010 | Imao |
| 7,826,729 B2 | 11/2010 | Cullen |
| 7,956,576 B2 | 6/2011 | Neu |
| 7,991,381 B1 | 8/2011 | Dunne |
| 7,991,575 B2 | 8/2011 | Vogel |
| 8,016,676 B2 | 9/2011 | Carter |
| 8,125,329 B1 | 2/2012 | Hirou |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |

(56) References Cited

U.S. PATENT DOCUMENTS

| | | |
|---|---|---|
| 8,164,614 B2 | 4/2012 | Carter |
| D660,819 S | 5/2012 | Chen |
| 8,193,919 B2 | 6/2012 | Langer |
| 8,224,311 B2 | 7/2012 | Majmundar |
| 8,237,574 B2 | 8/2012 | Anderson |
| 8,334,656 B2 | 12/2012 | Weiss |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,630,452 B2 | 1/2014 | Mardirossian |
| 8,665,333 B1 | 3/2014 | Sharma |
| 8,669,876 B2 | 3/2014 | Anderson |
| D707,147 S | 6/2014 | Crippa |
| 8,780,201 B1 | 7/2014 | Scalisi |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi |
| 8,842,180 B1 | 9/2014 | Kasmir |
| 8,866,598 B2 | 10/2014 | Collins |
| 8,872,915 B1 | 10/2014 | Scalisi |
| 8,875,208 B1 | 10/2014 | Abkairov |
| 8,937,659 B1 | 1/2015 | Scalisi |
| 8,941,736 B1 | 1/2015 | Scalisi |
| 8,947,530 B1 | 2/2015 | Scalisi |
| 8,953,040 B1 | 2/2015 | Scalisi |
| 8,976,244 B2 | 3/2015 | Felt |
| 9,013,575 B2 | 4/2015 | Scalisi |
| 9,021,134 B1 | 4/2015 | Patel |
| 9,049,352 B2 | 6/2015 | Scalisi |
| 9,053,622 B2 | 6/2015 | Scalisi |
| 9,055,202 B1 | 6/2015 | Scalisi |
| 9,057,210 B2 | 6/2015 | Dumas |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir |
| 9,071,923 B2 | 6/2015 | Zhang |
| 9,113,051 B1 | 8/2015 | Scalisi |
| 9,113,052 B1 | 8/2015 | Scalisi |
| 9,142,214 B2 | 9/2015 | Scalisi |
| 9,172,922 B1 | 10/2015 | Kasmir |
| 9,196,104 B2 | 11/2015 | Dumas |
| 9,218,696 B2 | 12/2015 | Dumas |
| 9,230,424 B1 | 1/2016 | Scalisi |
| 9,282,665 B1 | 3/2016 | Ladanyi |
| 9,336,637 B2 | 5/2016 | Neil |
| 9,338,594 B1 | 5/2016 | Onnen |
| 9,584,775 B2 | 2/2017 | Siminoff |
| 9,615,199 B1 | 4/2017 | Haney |
| D788,061 S | 5/2017 | Siminoff |
| D789,404 S | 6/2017 | Modestine |
| D789,820 S | 6/2017 | Siminoff |
| 9,674,433 B1 | 6/2017 | De La Cruz |
| D791,165 S | 7/2017 | Modestine |
| D791,240 S | 7/2017 | Lemberger |
| D791,241 S | 7/2017 | Lemberger |
| D791,243 S | 7/2017 | Loew |
| D791,878 S | 7/2017 | Loew |
| 9,697,723 B1 | 7/2017 | Ladanyi |
| 9,734,675 B2 | 8/2017 | Siminoff |
| D798,177 S | 9/2017 | Siminoff |
| 9,761,092 B2 | 9/2017 | Chen |
| 9,810,887 B1 | 11/2017 | Abdala |
| 9,978,260 B2 | 5/2018 | Lee |
| 10,289,917 B1 | 5/2019 | Fu |
| 10,356,303 B1 * | 7/2019 | Jordan, II .......... G08B 21/0446 |
| 10,367,814 B2 | 7/2019 | Walker |
| 2001/0010555 A1 | 8/2001 | Driscoll |
| 2001/0022627 A1 | 9/2001 | Bernhardt |
| 2002/0097161 A1 | 7/2002 | Deeds |
| 2003/0009364 A1 | 1/2003 | Miyoshi |
| 2003/0025599 A1 | 2/2003 | Monroe |
| 2003/0081952 A1 | 5/2003 | Geng |
| 2003/0169178 A1 | 9/2003 | Jensen |
| 2004/0085205 A1 | 5/2004 | Yeh |
| 2004/0085449 A1 | 5/2004 | Millet |
| 2004/0086093 A1 | 5/2004 | Schranz |
| 2004/0095254 A1 | 5/2004 | Maruszczak |
| 2004/0117039 A1 | 6/2004 | Hantke |
| 2004/0178889 A1 | 9/2004 | Buckingham |
| 2004/0229569 A1 | 11/2004 | Franz |
| 2004/0257336 A1 | 12/2004 | Hershkovitz |
| 2005/0006528 A1 | 1/2005 | Movsesian |
| 2005/0007451 A1 | 1/2005 | Chiang |
| 2005/0040954 A1 | 2/2005 | McNally |
| 2005/0046584 A1 | 3/2005 | Breed |
| 2005/0057361 A1 | 3/2005 | Giraldo |
| 2005/0071879 A1 | 3/2005 | Haldavnekar |
| 2005/0097248 A1 | 5/2005 | Kelley |
| 2005/0116480 A1 | 6/2005 | Deng |
| 2005/0237208 A1 | 10/2005 | Wojcik |
| 2005/0259641 A1 | 11/2005 | Beninato |
| 2005/0267605 A1 | 12/2005 | Lee |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0063517 A1 | 3/2006 | Oh |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0187034 A1 | 8/2006 | Styers |
| 2006/0195872 A1 | 8/2006 | Seo |
| 2006/0271678 A1 | 11/2006 | Jessup |
| 2006/0273895 A1 | 12/2006 | Kollin |
| 2007/0008081 A1 | 1/2007 | Tylicki |
| 2007/0012602 A1 | 1/2007 | Baldassari |
| 2007/0025712 A1 | 2/2007 | Jezierski |
| 2007/0029486 A1 | 2/2007 | Zhevelev |
| 2007/0046442 A1 | 3/2007 | Bartorelli |
| 2007/0052531 A1 | 3/2007 | Matthews |
| 2007/0066316 A1 | 3/2007 | Hoover |
| 2007/0103541 A1 | 5/2007 | Carter |
| 2007/0109441 A1 | 5/2007 | Cheng |
| 2007/0118831 A1 | 5/2007 | Kondo |
| 2007/0126574 A1 | 6/2007 | Langer |
| 2007/0132413 A1 | 6/2007 | Mays |
| 2007/0146115 A1 | 6/2007 | Roosli |
| 2007/0146122 A1 | 6/2007 | Ratner |
| 2007/0176778 A1 | 8/2007 | Ando |
| 2007/0194945 A1 | 8/2007 | Atkinson |
| 2007/0206510 A1 | 9/2007 | Morris |
| 2007/0216764 A1 | 9/2007 | Kwak |
| 2007/0237358 A1 | 10/2007 | Tseng |
| 2008/0004995 A1 | 1/2008 | Klingenberg |
| 2008/0028063 A1 | 1/2008 | Holmes |
| 2008/0036862 A1 | 2/2008 | Lang |
| 2008/0047287 A1 | 2/2008 | Ruppert |
| 2008/0128586 A1 | 6/2008 | Johnson |
| 2008/0129498 A1 | 6/2008 | Howarter |
| 2008/0129825 A1 | 6/2008 | Deangelis |
| 2008/0136915 A1 | 6/2008 | Iwamura |
| 2008/0145050 A1 | 6/2008 | Mayer |
| 2008/0157936 A1 | 7/2008 | Ebrom |
| 2008/0157956 A1 | 7/2008 | Radivojevic |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0167862 A1 | 7/2009 | Jentoft |
| 2009/0207249 A1 | 8/2009 | Erel |
| 2009/0213208 A1 | 8/2009 | Glatt |
| 2009/0243852 A1 | 10/2009 | Haupt |
| 2009/0273670 A1 | 11/2009 | Tamayo |
| 2009/0284578 A1 | 11/2009 | Carter |

(56) References Cited

U.S. PATENT DOCUMENTS

| | | |
|---|---|---|
| 2009/0296641 A1 | 12/2009 | Bienas |
| 2009/0302995 A1 | 12/2009 | Park |
| 2009/0308116 A1 | 12/2009 | Lambrou |
| 2010/0087161 A1 | 4/2010 | Young |
| 2010/0103300 A1 | 4/2010 | Jones |
| 2010/0109903 A1 | 5/2010 | Carrick |
| 2010/0134072 A1 | 6/2010 | Neu |
| 2010/0141761 A1 | 6/2010 | McCormack |
| 2010/0195810 A1 | 8/2010 | Mota |
| 2010/0225455 A1 | 9/2010 | Claiborne |
| 2010/0245060 A1 | 9/2010 | Tylicki |
| 2010/0276570 A1 | 11/2010 | Moser |
| 2010/0289661 A1 | 11/2010 | Styers |
| 2011/0025852 A1 | 2/2011 | Tanaka |
| 2011/0028118 A1 | 2/2011 | Thomas |
| 2011/0074570 A1 | 3/2011 | Feldstein |
| 2011/0090085 A1 | 4/2011 | Belz |
| 2011/0121940 A1 | 5/2011 | Jones |
| 2011/0140845 A1 | 6/2011 | Sanders |
| 2011/0156566 A1 | 6/2011 | Chen |
| 2011/0207509 A1 | 8/2011 | Crawford |
| 2011/0221582 A1 | 9/2011 | Chuey |
| 2011/0260880 A1 | 10/2011 | Dean |
| 2011/0264405 A1 | 10/2011 | Vogel |
| 2011/0287718 A1 | 11/2011 | Abel |
| 2011/0313775 A1 | 12/2011 | Laligand |
| 2012/0011559 A1 | 1/2012 | Miettinen |
| 2012/0027248 A1 | 2/2012 | Feris |
| 2012/0030133 A1 | 2/2012 | Rademaker |
| 2012/0044049 A1 | 2/2012 | Vig |
| 2012/0044050 A1 | 2/2012 | Vig |
| 2012/0044085 A1 | 2/2012 | Hung |
| 2012/0085824 A1 | 4/2012 | Handshaw |
| 2012/0098439 A1 | 4/2012 | Recker |
| 2012/0105631 A1 | 5/2012 | Hutchings |
| 2012/0108215 A1 | 5/2012 | Kameli |
| 2012/0113253 A1 | 5/2012 | Slater |
| 2012/0127308 A1 | 5/2012 | Eldershaw |
| 2012/0162416 A1 | 6/2012 | Su |
| 2012/0182427 A1 | 7/2012 | Marshall |
| 2012/0200942 A1 | 8/2012 | Schmidt |
| 2012/0229282 A1 | 9/2012 | Zagami |
| 2012/0230203 A1 | 9/2012 | Casey |
| 2012/0230696 A1 | 9/2012 | Pederson |
| 2012/0262581 A1 | 10/2012 | Carter |
| 2012/0267962 A1 | 10/2012 | Hanchett |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0293310 A1 | 11/2012 | Fitzgibbon |
| 2012/0320150 A1 | 12/2012 | Montgomery |
| 2012/0327225 A1 | 12/2012 | Barley |
| 2012/0327246 A1 | 12/2012 | Senior |
| 2013/0017812 A1 | 1/2013 | Foster |
| 2013/0020875 A1 | 1/2013 | Wozniak |
| 2013/0039499 A1 | 2/2013 | Patenaude |
| 2013/0045763 A1 | 2/2013 | Ruiz |
| 2013/0057695 A1 | 3/2013 | Huisking |
| 2013/0057696 A1 | 3/2013 | Felt |
| 2013/0091213 A1 | 4/2013 | Diab |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147616 A1 | 6/2013 | Lambert |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0223833 A1 | 8/2013 | Tenenbaum |
| 2013/0286211 A1 | 10/2013 | Cao |
| 2013/0293722 A1 | 11/2013 | Chen |
| 2013/0328522 A1 | 12/2013 | Brockman |
| 2013/0335219 A1 | 12/2013 | Malkowski |
| 2014/0009609 A1 | 1/2014 | Webster |
| 2014/0015967 A1 | 1/2014 | Moore |
| 2014/0070922 A1 | 3/2014 | Davis |
| 2014/0077929 A1 | 3/2014 | Dumas |
| 2014/0087780 A1 | 3/2014 | Abhyanker |
| 2014/0088761 A1 | 3/2014 | Shamlian |
| 2014/0118600 A1 | 5/2014 | Son |
| 2014/0125754 A1 | 5/2014 | Haywood |
| 2014/0149706 A1 | 5/2014 | Shim |
| 2014/0167676 A1 | 6/2014 | Mack |
| 2014/0188643 A1 | 7/2014 | Murphy |
| 2014/0210590 A1 | 7/2014 | Castro |
| 2014/0253725 A1 | 9/2014 | Hsu |
| 2014/0260449 A1 | 9/2014 | Uyeda |
| 2014/0265359 A1 | 9/2014 | Cheng |
| 2014/0266669 A1 | 9/2014 | Fadell |
| 2014/0266767 A1 | 9/2014 | Huang |
| 2014/0267716 A1 | 9/2014 | Child |
| 2014/0267740 A1 | 9/2014 | Almomani |
| 2014/0285672 A1 | 9/2014 | Hogasten |
| 2014/0292194 A1 | 10/2014 | Sagal |
| 2014/0292481 A1 | 10/2014 | Dumas |
| 2014/0320663 A1 | 10/2014 | Chien |
| 2014/0334684 A1 | 11/2014 | Strimling |
| 2014/0340894 A1 | 11/2014 | Chien |
| 2014/0368643 A1 | 12/2014 | Siegel |
| 2015/0022319 A1 | 1/2015 | Chutorash |
| 2015/0022618 A1 | 1/2015 | Siminoff |
| 2015/0022620 A1 | 1/2015 | Siminoff |
| 2015/0027178 A1 | 1/2015 | Scalisi |
| 2015/0029335 A1 | 1/2015 | Kasmir |
| 2015/0035987 A1 | 2/2015 | Fernandez |
| 2015/0049191 A1 | 2/2015 | Scalisi |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0077220 A1 | 3/2015 | Davis |
| 2015/0084779 A1 | 3/2015 | Saladin |
| 2015/0092055 A1 | 4/2015 | Scalisi |
| 2015/0109104 A1 | 4/2015 | Fadell |
| 2015/0109111 A1 | 4/2015 | Lee |
| 2015/0109112 A1 | 4/2015 | Fadell |
| 2015/0112885 A1 | 4/2015 | Fadell |
| 2015/0120015 A1 | 4/2015 | Fadell |
| 2015/0120598 A1 | 4/2015 | Fadell |
| 2015/0127712 A1 | 5/2015 | Fadell |
| 2015/0145991 A1 | 5/2015 | Russell |
| 2015/0156030 A1 | 6/2015 | Fadell |
| 2015/0156031 A1* | 6/2015 | Fadell ............... G08B 29/185 700/90 |
| 2015/0161856 A1 | 6/2015 | Wilson |
| 2015/0163463 A1 | 6/2015 | Hwang |
| 2015/0179031 A1 | 6/2015 | Wallace |
| 2015/0185964 A1 | 7/2015 | Stout |
| 2015/0194839 A1 | 7/2015 | Wojcik |
| 2015/0208032 A1 | 7/2015 | Gavney |
| 2015/0211259 A1 | 7/2015 | Dumas |
| 2015/0213658 A1 | 7/2015 | Dumas |
| 2015/0228281 A1 | 8/2015 | Raniere |
| 2015/0236966 A1 | 8/2015 | Francini |
| 2015/0275564 A1 | 10/2015 | Rosenthal |
| 2015/0276266 A1 | 10/2015 | Warren |
| 2015/0309487 A1 | 10/2015 | Lyman |
| 2015/0310381 A1 | 10/2015 | Lyman |
| 2015/0312531 A1 | 10/2015 | Samad |
| 2015/0338812 A1 | 11/2015 | Miura |
| 2015/0339895 A1 | 11/2015 | Chen |
| 2015/0347910 A1 | 12/2015 | Fadell |
| 2016/0001719 A1 | 1/2016 | Frost |
| 2016/0019495 A1 | 1/2016 | Kolchin |
| 2016/0057199 A1 | 2/2016 | Aziz |
| 2016/0058181 A1 | 3/2016 | Han |
| 2016/0073479 A1 | 3/2016 | Erchak |
| 2016/0078699 A1 | 3/2016 | Kalb |
| 2016/0104061 A1 | 4/2016 | McGill |
| 2016/0105644 A1 | 4/2016 | Smith |

(56) References Cited

U.S. PATENT DOCUMENTS

| | | |
|---|---|---|
| 2016/0125357 A1 | 5/2016 | Hall |
| 2016/0171435 A1 | 6/2016 | Newton |
| 2016/0171439 A1 | 6/2016 | Ladden |
| 2016/0191864 A1 | 6/2016 | Siminoff |
| 2016/0219254 A1 | 7/2016 | Hu |
| 2016/0235236 A1 | 8/2016 | Byers |
| 2016/0247344 A1 | 8/2016 | Eichenblatt |
| 2016/0261425 A1 | 9/2016 | Horton |
| 2016/0292936 A1 | 10/2016 | Palmer |
| 2016/0300187 A1 | 10/2016 | Kashi |
| 2016/0307380 A1 | 10/2016 | Ho |
| 2016/0330403 A1 | 11/2016 | Siminoff |
| 2016/0366373 A1 | 12/2016 | Siminoff |
| 2017/0023780 A1 | 1/2017 | Braker |
| 2017/0064504 A1 | 3/2017 | Jose |
| 2017/0109984 A1 | 4/2017 | Child |
| 2017/0124510 A1 | 5/2017 | Catering |
| 2017/0149855 A1 | 5/2017 | Doshi |
| 2017/0160137 A1 | 6/2017 | Jeong |
| 2017/0160138 A1 | 6/2017 | Jeong |
| 2017/0160144 A1 | 6/2017 | Jeong |
| 2017/0162225 A1 | 6/2017 | Jeong |
| 2017/0163944 A1 | 6/2017 | Jeong |
| 2017/0220872 A1 | 8/2017 | Child |
| 2017/0251035 A1 | 8/2017 | Siminoff |
| 2017/0251173 A1 | 8/2017 | Siminoff |
| 2017/0251182 A1 | 8/2017 | Siminoff |
| 2017/0272706 A1 | 9/2017 | Jeong |
| 2017/0280112 A1 | 9/2017 | Siminoff |
| 2017/0280565 A1 | 9/2017 | Tso |
| 2017/0293883 A1 | 10/2017 | Li |
| 2017/0294694 A1 | 10/2017 | Tso |
| 2018/0019889 A1 | 1/2018 | Burns |

FOREIGN PATENT DOCUMENTS

| | | |
|---|---|---|
| CN | 1902609 B | 5/2010 |
| CN | 202872976 U | 4/2013 |
| CN | 202939738 U | 5/2013 |
| EP | 0684743 B1 | 11/1995 |
| GB | 2400958 B | 7/2005 |
| WO | 2001093220 A1 | 12/2001 |
| WO | 2007111802 A2 | 10/2007 |
| WO | 2014062321 A1 | 4/2014 |
| WO | 2014107196 A1 | 7/2014 |
| WO | 2014144628 A2 | 9/2014 |
| WO | 2015023737 A1 | 2/2015 |
| WO | 2016032217 A1 | 3/2016 |

OTHER PUBLICATIONS

MyIntercom Video System—Downloaded on Jun. 8, 2015 from http://myintercom.de/en/funktionsweise.
Kocchi's Cobell Wi-Fi Doorbell—Downloaded on Sep. 14, 2015 from http://www.kocchis.com/Cobell_Manual.pdf.
August Doorbell Cam—Downloaded on Nov. 12, 2015 from http://august.com/products/august-doorbell/.
Nest Home Index—Downloaded on Nov. 12, 2015 from https://nest.com/blog/2015/11/09/the-first-nest-home-index/?utm_medium=paid%20social&utm_source=Facebook&utm_campaign=Nest%20Home%20Index&utm_content=Launch%20post.
Engadget—Amazon partners are reportedly exploring in-home deliveries—Downloaded on Oct. 19, 2017 from https://www.engadget.com/2016/09/27/amazon-august-garageio-inhome/; prior art publication at least as of Sep. 27, 2016.
Logittech—Logitech Circle 2—Downloaded on Oct. 19, 2017 from from https://www.logitech.com/en-us/product/circle-2-home-security-camera; prior art publication at least as of Jul. 26, 2017.
Ny Times—Was That an Intruder or a Pet? The Security Cams That Can Tell—Downloaded on Oct. 19, 2017 from https://www.nytimes.com/2017/08/09/technology/personaltech/internet-connected-security-cameras-wirecutter.html?rref=collection%2Fsectioncollection%2Fpersonaltech; prior art publication at least as of Aug. 10, 2017.
Wisenet—SmartCam D1—Downloaded on Oct. 19, 2017 from http://www.wisenetlife.com/en-us/product/SmartCam/SNH-V6435DN;jsessionid=023065D418C9E9CA7335F6D9B4E2C8DC/faq/?currtPg=4; prior art publication at least as of Sep. 23, 2017.
Nortek Control—Go Control: Smart Doorbell Camera—Downloaded on Oct. 19, 2017 from https://www.nortekcontrol.com/pdf/literature/GC-DBC-1-GoControl-Smart-Doorbell-Camera-Spec-Sheet.pdf; prior art publication at least as of Dec. 18, 2016.
HSN—Samsung SmartCam High-Definition Video Doorbell—Downloaded on Oct. 25, 2017 from https://www.hsn.com/products/samsung-smartcam-high-definition-video-doorbell/8534791; prior art publication at least as of Oct. 22, 2017.
Wirecutter—The Best Smart Doorbell Camera—Downloaded on Oct. 25, 2017 from https://thewirecutter.com/reviews/best-smart-doorbell-camera/; prior art publication at least as of Oct. 19, 2017.
Newsday—Google's Nest launches video doorbell, new security system—Downloaded on Oct. 25, 2017 from https://www.newsday.com/lifestyle/google-s-nest-launches-video-doorbell-new-security-system-1.14498694; prior art publication at least as of Oct. 18, 2017.
ZD Net—Amazon to develop a smart doorbell to deliver packages inside your home—Downloaded on Oct. 25, 2017 from http://www.zdnet.com/article/amazon-plans-to-develop-smart-doorbell-to-deliver-packages-inside-your-home/; prior art publication at least as of Oct. 11, 2017.
Dealerscope—Petra Named Exclusive Distributor for New Uniden U-Bell DB1 Wireless Video Doorbell—Downloaded on Oct. 25, 2017 from http://www.dealerscope.com/article/petra-named-exclusive-distributor-new-uniden-u-bell-db1-wireless-video-doorbell/; prior art publication at least as of Oct. 3, 2017.
Nest—Say hello to Nest Hello—Downloaded on Oct. 25, 2017 from https://nest.com/blog/2017/09/20/say-hello-to-nest-hello/?utm_campaign=nest%20hello%20preannounce&utm_source=nest%20customers&utm_medium=m-email&utm_content=learn%20more, prior art publication at least as of Sep. 27, 2017.
Gate: Your Personal Doorman—Downloaded on Oct. 25, 2017 from https://www.indiegogo.com/projects/gate-your-personal-doorman#/; prior art publication at least as of Sep. 25, 2017.
Mashable—Walmart is teaming with a smart lock startup to deliver food straight to your fridge—Downloaded on Oct. 25, 2017 from http://mashable.com/2017/09/24/walmart-smart-lock-grocery-delivery/#7b0i0W4L_mqf; prior art publication at least as of Sep. 24, 2017.
Wired—Review: August Smart Lock—Downloaded on Oct. 25, 2017 from https://www.wired.com/2017/09/review-august-smart-lock/; prior art publication at least as of Sep. 24, 2017.
Amazon—Amazon Key—Downloaded on Oct. 25, 2017 from https://www.amazon.com/b/?ie=UTF8&node=17285120011.
Amazon—Amazon Key In-Home Kit includes: Amazon Cloud Cam (Key Edition) indoor security camera and compatible smart lock—Downloaded on Oct. 25, 2017 from https://www.amazon.com/dp/B00KCYQGXE?locationCheckInvoked=1.
Amazon—Amazon Cloud Cam Indoor Security Camera, works with Alexa—Downloaded on Oct. 25, 2017 from https://www.amazon.com/Amazon-Cloud-Indoor-Security-Camera/dp/B01C4UY0JK/ref=sr_tr_1?s=amazon-devices&ie=UTF8&qid=1508945752&sr=1-1&keywords=amazon+cloud+cam.
Best Buy—Vivint Smart Home—Downloaded on Oct. 25, 2017 from https://www.bestbuy.com/site/home-security-solutions/smart-home/pcmcat748302047019.c?id=pcmcat748302047019&ref=P30T29R169&loc=BODY&CampaignID=860152&eut=2387920889; prior art publication at least as of Aug. 25, 2017.
Ring—Chime Pro—Downloaded on Oct. 25, 2017 from https://ring.com/chime-pro; prior art publication at least as of Aug. 23, 2017.
Twice—Samsung Wisenet SmartCam D1 Video Doorbell—Downloaded on Oct. 25, 2017 from http://www.twice.com/news/smart-home/samsung-wisenet-smartcam-d1-video-doorbell/65643; prior art publication at least as of Jul. 31, 2017.
Tech Crunch—Ring adds three connected Spotlight Cams to its Floodlight Cam lineup—Downloaded on Oct. 25, 2017 from https://techcrunch.com/2017/07/31/ring-adds-three-connected-spotlight-cams-to-its-floodlight-cam-lineup/; prior art publication at least as of Aug. 2, 2017.

(56) References Cited

OTHER PUBLICATIONS

CNBC—This $200 'smart' doorbell will show you who (or what) is in front of your house at all times—Downloaded on Oct. 25, 2017 from https://www.cnbc.com/2017/07/23/ring-doorbell-2-review. html; prior art publication at least as of Jul. 23, 2017.
ZMODO—Greet Pro with Beam Alert—Downloaded on Oct. 25, 2017 from http://www.zmodo.com/greetpro-1080p-wifi-video-doorbell/.
August—August Doorbell Cam Pro—Downloaded on Oct. 25, 2017 from http://august.com/products/doorbell-camera/?utm_source=Owners+from+Salesforce&utm_campaign=83b33655ed-EMAIL_CAMPAIGN_2017_06_06&utm_medium=email&utm_term=0_15a5cc0eb8-83b33655ed-247286221&mc_cid=83b33655ed&mc_eid=9d1996d140; prior art publication at least as of Jun. 11, 2017.
ATT—August Wi-Fi Doorbell Cam—Downloaded on Oct. 25, 2017 from https://m.att.com/shopmobile/accessories/specialty-items/August_Wi-Fi_Doorbell_Cam/_jcr_content.html?referrer=https%253A%2F%2Fwww.google.com%2F; prior art publication at least as of Jun. 9, 2017.
Ding, a beautifully simple smart doorbell—Downloaded on Oct. 25, 2017 from https://www.indiegogo.com/projects/ding-a-beautifully-simple-smart-doorbell-home-technology#/; prior art publication at least as of Jun. 5, 2017.
Clare Controls—The Clare Video Doorbell—Downloaded on Oct. 25, 2017 from https://www.clarecontrols.com/video-doorbell; prior art publication at least as of Jun. 1, 2017.
Business Insider—The best security cameras you can buy for your home—Downloaded on Oct. 25, 2017 from http://www.businessinsider.com/best-security-camera-home/#the-best-home-security-camera-for-outdoors-and-indoors-2; prior art publication at least as of May 27, 2017.
Smanos—Smart Video Doorbell—Downloaded on Oct. 25, 2017 from http://www.smanos.com/doorbell; prior art publication at least as of May 22, 2017.
Ring—Products—Downloaded on Oct. 30, 2017 from https://ring.com/.
Honeywell RCWL105A1003/N Plug-in Wireless Doorbell / Door Chime and Push Button; Downloaded on Apr. 16, 2019 from https://www.amazon.com/Honeywell-RCWL105A1003-Plug-Wireless-Button/dp/B001GOMATM; Prior art at least as of Sep. 26, 2008.
Sado Tech Model C Wireless Doorbell Operating at over 500-feet Range with Over 50 Chimes, No Batteries Required for Receiver; Downloaded on Apr. 16, 2019 from https://www.amazon.com/SadoTech-Wireless-Doorbell-Operating-Batteries/dp/B00FR4YQYK; Prior art at least as of Oct. 10, 2013.
Zheludev; The life and times of the LED—a 100-year history; Nature Photonics; Apr. 2007, pp. 189-192; vol. 1; Nature Publishing Group; Retrieved Apr. 16, 2019.
Yam; Innovative Advances in LED Technology; Microelectronics journal; Nov. 9, 2004; pp. 129-137; vol. 36; Retrieved Apr. 16, 2019.
Perkin Elmer; LHi968—LHi 968 Dual Element Detector, Top Line; Prior art at least as of Mar. 18, 2007.
Perkin Elmer; Pyroelectric Infrared Detectors; Prior art at least as of Apr. 16, 2009.
Perkin Elmer; Dual Element Detector; Prior art at least as of Mar. 25, 2007.
IEEE Standards Association; IEEE 802.15.1-2002—IEEE Standard for Telecommunications and Information Exchange Between Systems—LAN/MAN—Specific Requirements—Part 15: Wireless Medium Access Control (MAC) and Physical Layer (PHY) Specifications for Wireless Personal Area Networks (WPANs); Downloaded on Apr. 29, 2019 from https://standards.ieee.org/standard/802_15_1-2002.html; Prior art at least as of Jun. 14, 2002.
Bluetooth—Our History; Prior art least as of Oct. 17, 2013.
Nutone—LA600WH Door Chime—Installation & Operating Instructions; Downloaded on Apr. 29, 2019 from http://www.nutone.com/common/productDigitalAssethandler.ashx?id=5b25a40a-c56f-44bf-99d1-5b0c17f266e9; Prior art at least as of Sep. 18, 2013.

Nutone; LA600WH Universal Wired/Wireless MP3 Doorbell Mechanism, 6"w×9½"h×2¼"d in White; Downloaded on Apr. 29, 2019 from http://www.nutone.com/products/product/e2562b0e-4fe5-432a-ac70-228953b19875; Prior art at least as of May 30, 2013.
Intune; InTune MP3 Door Chime Manual; Downloaded on Apr. 29, 2019 from https://www.heath-zenith.com/system/spree/documents/attachments/000/000/839/original/205371-02A.pdf?1436551434; Prior art at least as of 2013.
Nutone; College Pride Mechanism; Prior art at least as of Jun. 8, 2013.
Seco-Larm; Enforcer DP-236Q Wireless Video Door Phone Manual; Downloaded on Apr. 29, 2019 from http://www.seco-larm.com/image/data/A_Documents/02_Manuals/MiDP-236Q_150528.pdf.
CNIPA—China National Intellectual Property Administration; Notification of the Third Office Action of CN Application No. IIE151535; dated Nov. 15, 2019.
Craig & Comapny—Home Tech: Doorbot—Downloaded on Nov. 18, 2013 from http://www.craigncompany.com/home-tech-doorbot/; prior art publication at least as of Jun. 10, 2013.
The Next Web—Hardware renaissance: A look at the Christie Street platform and doorbot video streaming doorbell—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.
Digital Trends—Doorbot wi-fi doorbell camera lets you see visitors on your smartphone—Downloaded on Nov. 18, 2013 from http://www.digitaltrends.com/lifestyle/doorbot-camera-see-visitors-smartphone/; prior art publication at least as of Dec. 9, 2012.
Doorbot website—Downloaded on Jul. 26, 2013 from http://www.getdoorbot.com.
Doorbot users manual—Downloaded on Nov. 18, 2013 from http://static.mydoorbot.com/DoorBot%20Users%20Manual%201.0.pdf.
Doorbot "fact sheet"—Downloaded on Nov. 18, 2013 from http://cdn.shopify.com/s/files/1/0247/6501/files/DoorBotMediaKit.pdf?17037.
Cellnock—Index page—Originally downloaded on Sep. 23, 2013 from http://cellnock.com/index.html; The website says CellNock is "patent pending".
Cellnock website—downloaded on Nov. 18, 2013 from http://cellnock.com/; The website says CellNock is "patent pending".
Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
Skybell—MySkyBell.com (previously iDoorCam.com)—Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
Mybells—Downloaded on Nov. 18, 2013 from http://www.indiegogo.com/projects/mybells-the-smart-bells.
Wireless Video Doorbell Pager—Downloaded on Aug. 9, 2013 from http://www.indiegogo.com/projects/wireless-video-doorbell-pager-4.
Lockitron—Downloaded on Jul. 24, 2013 from https://lockitron.com/preorder.
Eyetalk for Home—Downloaded May 24, 2013 from http://www.revolutionaryconceptsinc.com/forhome.html.
Smartbell—Downloaded on Dec. 5, 2013 from http://smartbell.co/.
Smartbell—A Doorbell for Smartphones, published by Scrambled Brains Tech, LLC., Oct. 1, 2013.
August Smart Lock—Downloaded on Jun. 10, 2014 from www.August.com.
August Smart Lock—Downloaded on Oct. 10, 2014 from www.August.com.
Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—Downloaded on Oct. 10, 2014 from http://s7d5.scene7.com/is/content/BDHHI/Kwikset/Website%20Content/Kevo/installation_guide.pdf.

(56) References Cited

OTHER PUBLICATIONS

Schlage Electronic Lock—User guide—Downloaded on Jun. 10, 2014 from www.schlage.com.
AdaFruit—Lock-Style Solenoid—Downloaded on Aug. 22, 2014 from www.AdaFruit.com.
Wikipedia—Power Matters Alliance—Downloaded on Aug. 23, 2014 from www.wikipedia.com.
AdaFruit—Push-Pull Solenoid—Technical Details—Downloaded on Aug. 22, 2014 from www.AdaFruit.com.
Wikipedia—Qi—Downloaded on Aug. 23, 2014 from www.wikipedia.com.
TP-Link—Website—Downloaded on Jul. 15, 2014 from www.tp-link.us.
A HD Cameras—AC Adapter Spy Camera—Downloaded on Jun. 24, 2014 from ahdcameras.com.
Fanfare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Tech Crunch—Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
IChime—iChime Customizable Digital Chime System—Downloaded on Nov. 7, 2014 from http://www.ichime.com/.
Christie Street—Doorbot—Downloaded on Jun. 14, 2013 from https://christiestreet.com/products/doorbot.
IDoorcam—A Wi-Fi Enabled, Webcam Doorbell—Downloaded on Sep. 3, 2013 from http://www.idoorcam.com/.
Langer—Langer Doorbell Button Sized Light—Downloaded on Sep. 16, 2013 from http://www.youtube.com/watch?v=u9nNCm4tSYI.
Langer—Langer Doorbell Light—Downloaded on Sep. 16, 2013 from http://www.youtube.com/watch?v=6dbU-Gyjgx8.
SmartBell—SmartBell on Kickstarter—Downloaded on Feb. 28, 2014 from http://www.kickstarter.com/projects/1256599792/smartbell-wi-fi-doorbell-for-video-chats-to-ios-an.
DefenDoor—DefenDoor by date LLC—Downloaded on Dec. 11, 2014 from https://www.kickstarter.com/projects/85455040/defendoor-a-home-security-system-that-syncs-with-y.
CNET—Notifi by Chamberlain—Downloaded on Jan. 9, 2015 from http://www.cnet.com/products/chamberlain-notifi-video-door-chime/.
I-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
Doorbird—Downloaded on Jan. 23, 2015 from http://www.doorbird.com/.
Chui Doorbell—Downloaded on Jan. 23, 2015 from http://www.getchui.com/.
Tech Crunch—Chui Doorbell—Downloaded on Jan. 23, 2015 from http://techcrunch.com/2014/04/18/214-technologies-is-crowdfunding-a-smart-doorbell-called-chui/.
Giz Mag—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
CNET—Alarm.com Garage Door Camera—Downloaded on Mar. 9, 2015 from http://www.cnet.com/au/products/alarm-com-for-apple-watch/.
Rollup iHome Peephole Doorbell—Downloaded on May 7, 2015 from http://www.rollupcn.com.
Tech Crunch—Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstarter.com/projects/1544392549/peeple-caller-id-for-your-front-door/video_share.

\* cited by examiner

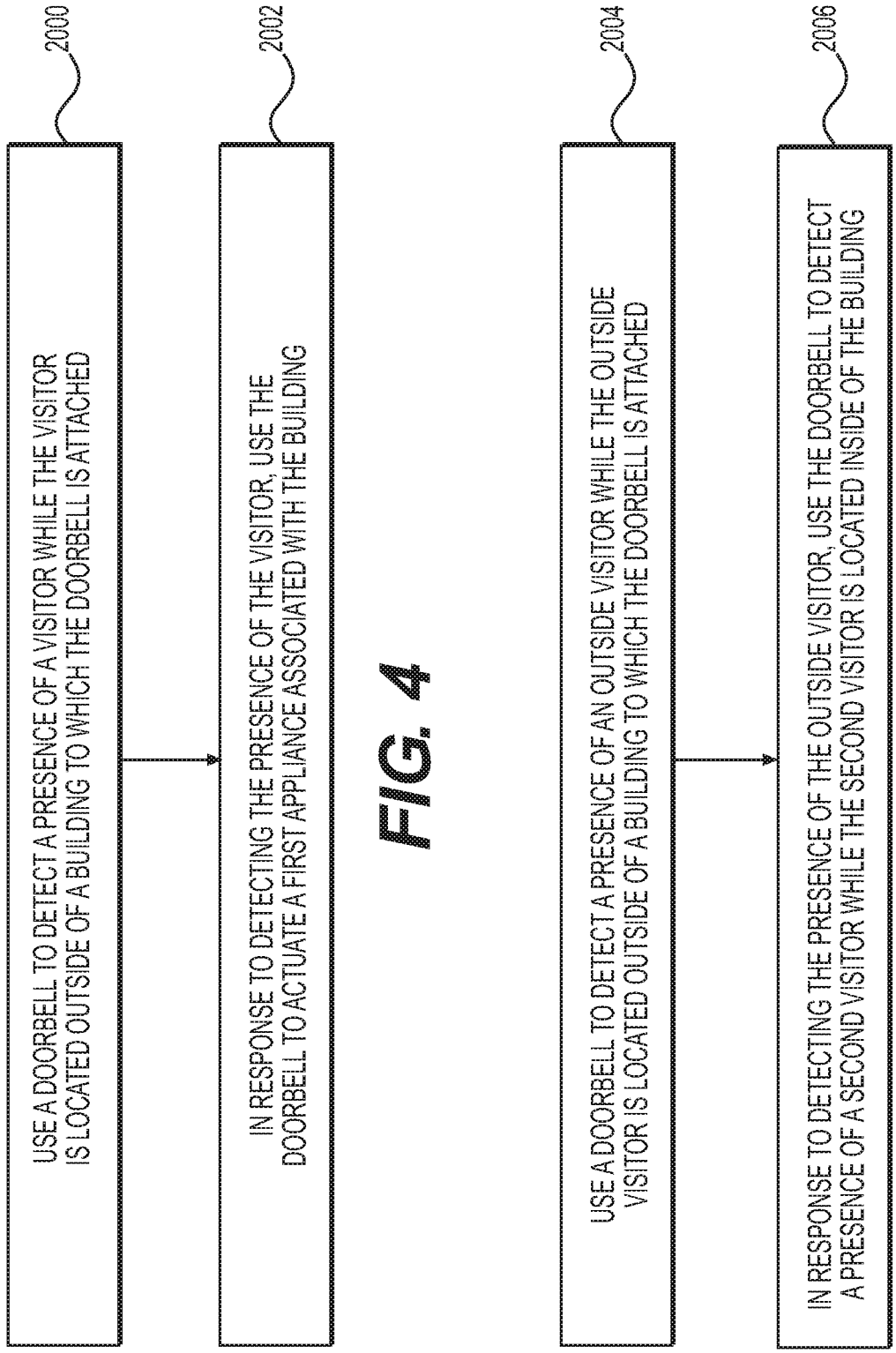

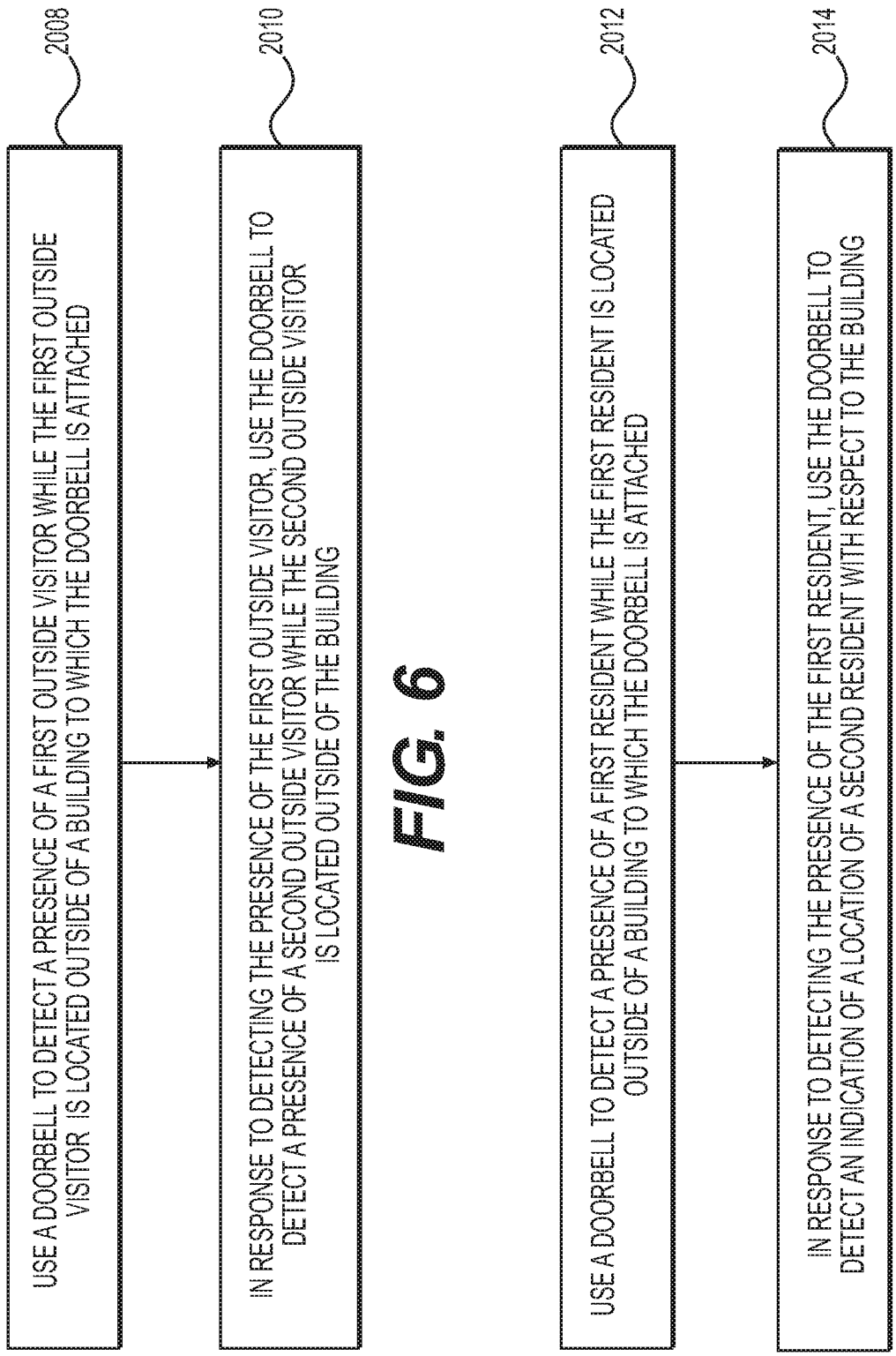

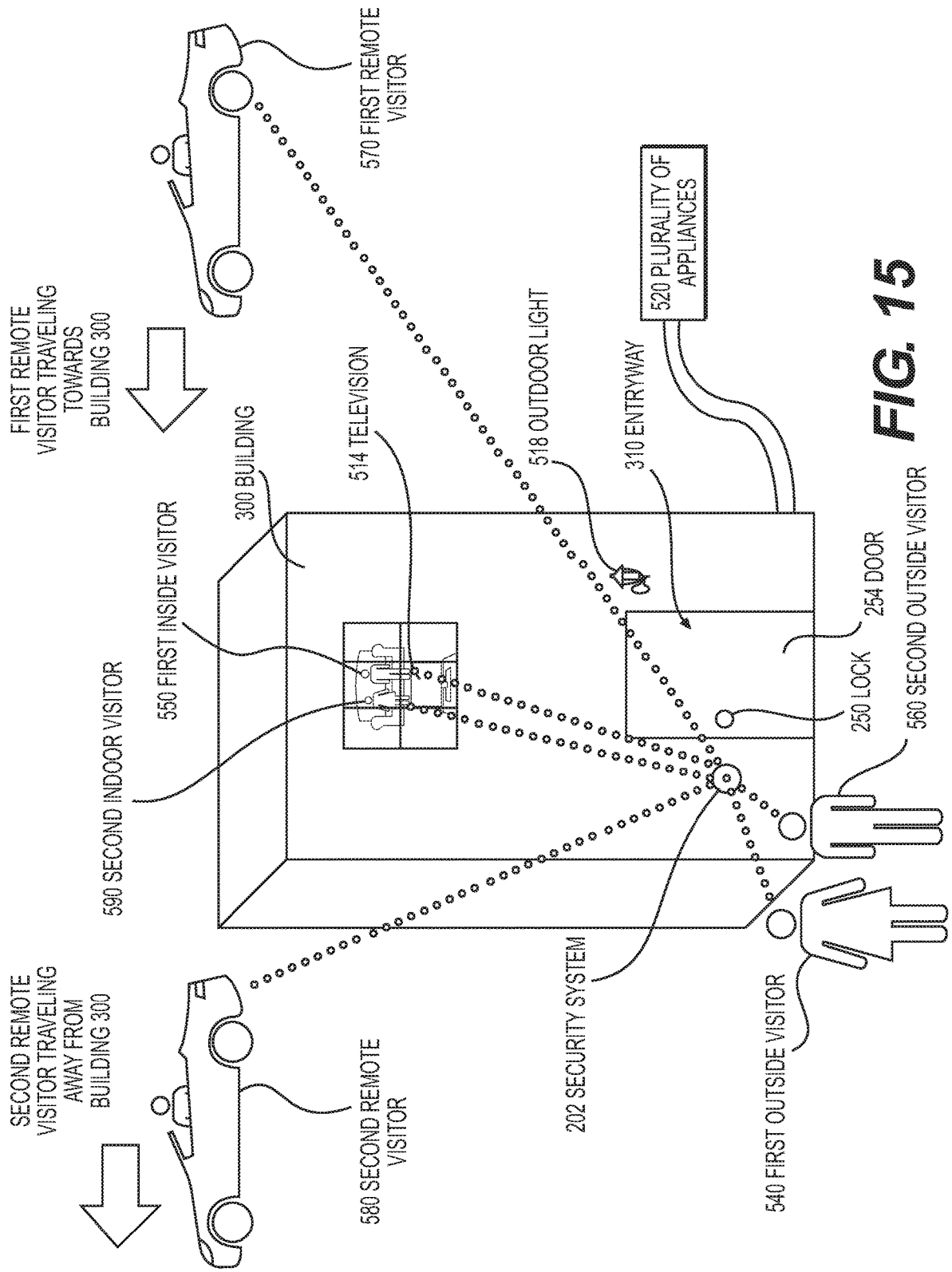

DOORBELL COMMUNICATION SYSTEMS AND METHODS

CROSS-REFERENCE TO RELATED APPLICATIONS

The entire contents of U.S. Non-Provisional patent application Ser. No. 15/719,543; filed Sep. 28, 2017; and entitled DOORBELL COMMUNICATION SYSTEMS AND METHODS are incorporated by reference herein.

The entire contents of U.S. Non-Provisional patent application Ser. No. 15/615,818; filed Jun. 6, 2017; and entitled POWER OUTLET CAMERAS are incorporated by reference herein. The entire contents of U.S. Non-Provisional patent application Ser. No. 14/623,741; filed Feb. 17, 2015; and entitled POWER OUTLET CAMERAS are incorporated by reference herein.

The entire contents of U.S. Provisional Patent Application No. 62/072,943; filed Oct. 30, 2014; and entitled DOORBELL COMMUNICATION SYSTEMS AND METHODS are incorporated by reference herein.

The entire contents of U.S. Non-Provisional patent application Ser. No. 15/065,358; filed Mar. 9, 2016; and entitled VEHICLE TRACKING SYSTEMS AND METHODS are incorporated by reference herein.

The entire contents of U.S. Non-Provisional patent application Ser. No. 14/485,990; filed Sep. 15, 2014; and entitled ACTIVATING BUILDING ASSETS BASED ON AN INDIVIDUAL'S LOCATION are incorporated by reference herein.

TECHNICAL FIELD

The disclosure is applicable to doorbells attached to buildings, and more specifically to doorbells attached to buildings and triggering events associated with the buildings.

BACKGROUND

Residents and guests often arrive at buildings via an entryway. The entryway may often include a doorbell that is attached to the building. In response to the resident or guest approaching or entering the building, various events may occur. The resident, guest or another person within the building may manually trigger the events.

SUMMARY

Some methods include using a doorbell system to detect a presence of a visitor, the doorbell system can include a doorbell having a speaker, a microphone, a camera, and a button. The button can be configurable to enable the visitor to sound a chime. Methods can include detecting, by the doorbell system, the presence of the visitor while the visitor is located outside a building to which the doorbell is attached. The building can include a door having a lock that is configured to fasten the door to inhibit unauthorized entry into the building. In response to detecting the presence of the visitor, methods can include actuating, by the doorbell system, a first appliance associated with the building.

In some embodiments, the step of actuating the first appliance comprises actuating, by the doorbell system, a camera to record video and/or audio of an entryway located adjacent the doorbell. In response to detecting, by the doorbell system, the presence of the visitor, some methods include actuating, by the doorbell system, a second appliance associated with the building.

Even still, in some embodiments, the step of actuating the second appliance associated with the building comprises pausing, by the doorbell system, an image displayed on a screen of a television. Additionally, in some embodiments, the step of actuating the second appliance associated with the building comprises illuminating, by the doorbell system, an outdoor light located within 10 feet of the doorbell.

In some embodiments, the step of actuating the second appliance associated with the building comprises vibrating, by the doorbell system, a wearable device associated with a user. The first and second appliances can be selected from the group consisting of air conditioning, heating, lighting, television, and ventilation.

Methods can include determining, by the doorbell system, whether the visitor is a resident, a known guest, or an unknown guest. The resident can be authorized access to the building any time of day, the known guest can be authorized access to the building at a predetermined time of day, and the unknown guest may not be authorized access to the building.

In response to detecting the presence of the resident, methods can include determining whether the lock is in a locked position or an unlocked position. In response to determining the lock is in the locked position, methods may include actuating, by the doorbell system, the lock to move to the unlocked position.

In some embodiments, in response to detecting the presence of the known guest, methods can include determining, by the doorbell system, whether a present time is within the predetermined time of day and whether the lock is in the locked position or the unlocked position. In response to determining the present time is within the predetermined time of day and the lock is in the locked position, methods can include actuating, by the doorbell system, the lock to move to the unlocked position. In response to determining the time of day is not within the predetermined time of day and the lock is in the unlocked position, methods can include actuating, by the doorbell system, the lock to move to the locked position.

In response to detecting the presence of the unknown guest, methods can include determining, by the doorbell system, whether the lock is in the locked position or the unlocked position. In response to determining the lock is in the unlocked position, methods can include actuating, by the doorbell system, the lock to move to the locked position.

The step of determining, by the doorbell system, whether the visitor is the resident, the known guest, or the unknown guest can comprise determining, by the doorbell system, whether the visitor is the resident, the known guest, or the unknown guest via an identification method selected from the group consisting of facial recognition, retina scanning, iris recognition, and fingerprint recognition.

The step of determining, by the doorbell system, whether the visitor is a resident, known guest, or unknown guest can comprise detecting, by the doorbell system, a presence of a remote computing device associated with the resident, known guest, or unknown guest; and determining, by the doorbell system, whether the remote computing device is associated with the resident, known guest, or unknown guest. In some embodiments, the remote computing device is a smartphone, and wherein the step of detecting, by the doorbell system, the presence of the remote computing device comprises detecting, by the doorbell system, the presence of the remote computing device via a technology selected from the group consisting of Bluetooth, Wi-Fi, infrared, cellular, and Global Positioning System.

The disclosure also includes a method for using a doorbell system to detect a presence of an outside visitor and a presence of an inside visitor. The doorbell system can comprise a doorbell having a speaker, a microphone, a camera, and a button, wherein the button is configurable to enable the outside visitor to sound a chime. Methods can include detecting, by the doorbell system, the presence of the outside visitor while the outside visitor is located outside a building to which the doorbell is attached. The building can include a door having a lock configured to fasten the door to inhibit unauthorized entry into the building. In response to detecting the presence of the outside visitor, methods may also include detecting, by the doorbell system, the presence of the inside visitor while the inside visitor is located inside of the building.

Methods can include determining, by the doorbell system, whether the outside visitor is a first resident, first known guest, or first unknown guest. Methods can also include determining, by the doorbell system, whether the inside visitor is a second resident, second known guest, or second unknown guest. The first resident or second resident can be authorized access to the building any time of day. The first known guest or second known guest can be authorized access to the building at a predetermined time of day. The first unknown guest or second unknown guest may not be authorized access to the building.

In response to determining, by the doorbell system, the outside visitor is the first resident and the inside visitor is the second known guest or second unknown guest, methods can further include actuating, by the doorbell system, at least one selected appliance from an appliance record associated with the outside visitor.

In some embodiments, in response to determining the outside visitor is the first resident and the inside visitor is the second resident, methods can further include determining, by the doorbell system, whether a first appliance record associated with the outside visitor is ranked higher than a second appliance record associated with the inside visitor. In response to determining the first appliance record associated with the outside visitor is ranked higher than the second appliance record associated with the inside visitor, methods can include actuating, by the doorbell system, at least one appliance from the first appliance record.

In some embodiments, a first appliance record is associated with the outside visitor and a second appliance record is associated with the inside visitor. In response to determining the outside visitor is the first resident and the inside visitor is the second resident, methods can further include determining, by the doorbell system, whether a first appliance of the first appliance record is not defined in the second appliance record. In response to determining the first appliance of the first appliance record is not defined in the second appliance record, methods can include actuating, by the doorbell system, the first appliance. Methods may also include determining, by the doorbell system, whether a second appliance of the first appliance record is defined in the second appliance record. In response to determining the second appliance of the first appliance record is defined in the second appliance record, methods can further include determining, by the doorbell system, whether the second appliance is de-energized. In response to determining the second appliance is de-energized, methods may also include actuating, by the doorbell system, the second appliance.

The first appliance record can include at least a first predetermined appliance setting. In some embodiments, the second appliance is a television. Even still, in some embodiments, the step of actuating, by the doorbell system, the second appliance comprises energizing, by the doorbell system, the television; configuring, by the doorbell system, the television to receive a signal from a predetermined television channel as per the first predetermined appliance setting; and configuring, by the doorbell system, the television to a predetermined volume as per the first predetermined appliance setting.

The first appliance record can include at least a first predetermined appliance setting. In response to determining the second appliance is energized, the method can further include determining, by the doorbell system, whether the first appliance record is ranked higher than the second appliance record. In response to determining the first appliance record is ranked higher than the second appliance record, the method can include configuring, by the doorbell system, the second appliance as per the first predetermined appliance setting.

The disclosure can include a method for using a doorbell system to detect a presence of a first outside visitor and a presence of a second outside visitor. The doorbell system can include a doorbell having a speaker, a microphone, a camera, and a button. The button can be configurable to enable the first outside visitor to sound a chime. Methods can include detecting, by the doorbell system, the presence of the first outside visitor while the first outside visitor is located outside of a building to which the doorbell is attached. The building can comprise a door having a lock that is configured to fasten the door to inhibit unauthorized entry into the building. In response to detecting the presence of the first outside visitor, methods can include detecting, by the doorbell system, the presence of the second outside visitor while the second outside visitor is located outside of the building.

Methods can further include determining, by the doorbell system, whether the first outside visitor is a first resident, first known guest, or first unknown guest. Methods can also include determining, by the doorbell system, whether the second outside visitor is a second resident, second known guest, or second unknown guest. In some embodiments, the resident is authorized full access to the building, the known guest is authorized partial access to the building, and the unknown guest is not authorized access to the building. Full access can comprise unlocking the lock any time of day, and partial access can comprise unlocking the lock at a predetermined time of day.

The step of determining whether the visitor is the resident, the known guest, or the unknown guest can comprise determining, by the doorbell system, whether the visitor is the resident, the known guest, or the unknown guest via an identification method selected from the group consisting of facial recognition, fingerprint recognition, retina scanning, and iris recognition.

A first appliance record can be associated with the first outside visitor and a second appliance record is associated with the second outside visitor. In response to determining the first outside visitor is the first resident and the second outside visitor is the second resident. Methods can include determining, by the doorbell system, whether the first appliance record is ranked higher than the second appliance record. In response to determining the first appliance record is ranked higher than the second appliance record, methods can include actuating and configuring, by the doorbell system, a plurality of appliances as per the first appliance record.

Methods can include detecting, by the doorbell system, the presence of an inside visitor while the inside visitor is located inside of the building. Methods can include determining, by the doorbell system, whether the first outside visitor is a first resident, first known guest, or first unknown guest and determining, by the doorbell system, whether the second outside visitor is a second resident, second known guest, or second unknown guest. Some methods can include determining, by the doorbell system, whether the inside visitor is a third resident, third known guest, or third unknown guest.

In response to determining the first outside visitor is the first resident or the second outside visitor is the second resident, and in response to determining the inside visitor is the third resident, methods can include determining, by the doorbell system, whether a first appliance associated with an appliance record of the first resident or a second appliance associated with an appliance record of the second resident is de-energized. In some embodiments, in response to determining the first appliance associated with the appliance record of the first outside visitor or second appliance associated with the appliance record of the second outside visitor is de-energized, methods can include actuating and configuring, by the doorbell system, the first appliance as per the appliance record of the first outside visitor or the second appliance as per the appliance record of the second outside visitor.

The disclosure can include a method for using a doorbell system to detect a presence of a first resident and a presence of a second resident. The doorbell system can include a doorbell having a speaker, a microphone, a camera, and a button. The button can be configurable to enable the first resident to sound a chime. Methods can include detecting, by the doorbell system, the presence of the first resident while the first resident is located outside of a building to which the doorbell is attached. The building can include a door having a lock that is configured to fasten the door to inhibit unauthorized entry into the building.

In response to detecting the presence of the first resident, methods can include detecting, by the doorbell system, an indication of a location of the second resident with respect to the building, wherein the second resident is located remotely from the building. In response to detecting the indication of the location of the second resident is greater than one mile from the building, methods can further include actuating, by the doorbell system, at least one appliance as per a first appliance record associated with the first resident.

A first appliance record may be associated with the first resident and a second appliance record may be associated with the second resident. In response to detecting the indication of the location of the second resident is less than one mile from the building. Methods can further include determining, by the doorbell system, whether the second appliance record is ranked higher than the first appliance record. In response to determining the first appliance record is ranked higher than the second appliance record, methods can include actuating, by the doorbell system, all appliances as per the first appliance record. Methods can even include determining, by the doorbell system, whether the second resident is moving towards the building.

In response to determining the second resident is moving towards the building and in response to determining the second appliance record is ranked higher than the first appliance record, methods can include actuating, by the doorbell system, all appliances as per the second appliance record. In response to determining the second resident is not moving towards the building, methods can include actuating, by the doorbell system, all appliances as per the first appliance record.

A first appliance record may be associated with the first resident and a second appliance record may be associated with the second resident. In response to detecting that the indication of the location of the second resident is less than one mile from the building, methods may further include detecting, by the doorbell system, whether an indication of a location of a third resident is less than one mile from the building. The third resident may be located remotely from the building, and a third appliance record may be associated with the third resident. In response to detecting the indication of the location of the third resident is less than one mile from the building, methods can further include determining, by the doorbell system, whether the first appliance record, second appliance record, or third appliance record is ranked highest. In response to determining the first appliance record is ranked higher than the second and third appliance records, methods can include actuating, by the doorbell system, all appliances as per the first appliance record. In response to determining the second appliance record is ranked higher than the first and third appliance records, methods can include actuating, by the doorbell system, all appliances as per the second appliance record. In response to determining the third appliance record is ranked higher than the first and second appliance records, methods can include actuating, by the doorbell system, all appliances as per the third appliance record.

A first appliance record may be associated with the first resident and a second appliance record may be associated with the second resident. In response to detecting that the indication of the location of the second resident is less than one mile from the building, methods may further include detecting, by the doorbell system, whether an indication of a location of a third resident is less than one mile from the building. The third resident may be located remotely from the building, and a third appliance record may be associated with the third resident.

In response to detecting the indication of the location of the third resident is less than one mile from the building, methods may further determining, by the doorbell system, whether the second resident is moving towards the building; and determining, by the doorbell system, whether the third resident is moving towards the building.

In response to determining the second and third residents are moving towards the building, methods may further include determining, by the doorbell system, whether the first appliance record, second appliance record, or third appliance record is ranked highest. In response to determining the first appliance record is ranked higher than the second and third appliance records, methods may include actuating, by the doorbell system, all appliances as per the first appliance record. In response to determining the second appliance record is ranked higher than the first and third appliance records, methods may include actuating, by the doorbell system, all appliances as per the second appliance record.

In some embodiments, in response to determining the third appliance record is ranked higher than the first and second appliance records, methods may include actuating, by the doorbell system, all appliances as per the third appliance record. In response to determining the second resident is moving towards the building and the third resident is not moving towards the building, methods may further include determining, by the doorbell system, whether the first appliance record or the second appliance record is ranked highest. In response to determining the first appliance record is ranked higher than the second appliance record, methods may include actuating, by the doorbell system, all appliances as per the first appliance record. In response to determining the second appliance record is ranked higher than the first appliance record, methods may include actuating, by the doorbell system, all appliances as per the second appliance record.

In response to determining the third resident is moving towards the building and the second resident is not moving towards the building, methods can further include determining, by the doorbell system, whether the first appliance record or the third appliance record is ranked highest. In response to determining the first appliance record is ranked higher than the third appliance record, methods can include actuating, by the doorbell system, all appliances as per the first appliance record. In response to determining the third appliance record is ranked higher than the first appliance record, methods may include actuating, by the doorbell system, all appliances as per the third appliance record. In response to determining the second and third residents are not moving towards the building, methods may include actuating, by the doorbell system, all appliances as per the first appliance record.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

FIGS. 4-7 illustrate flow-charts of various methods of using a doorbell system, according to some embodiments.

FIGS. 11-15 illustrate a security system detecting a presence of multiple visitors, according to some embodiments.

DETAILED DESCRIPTION

Figure 1:
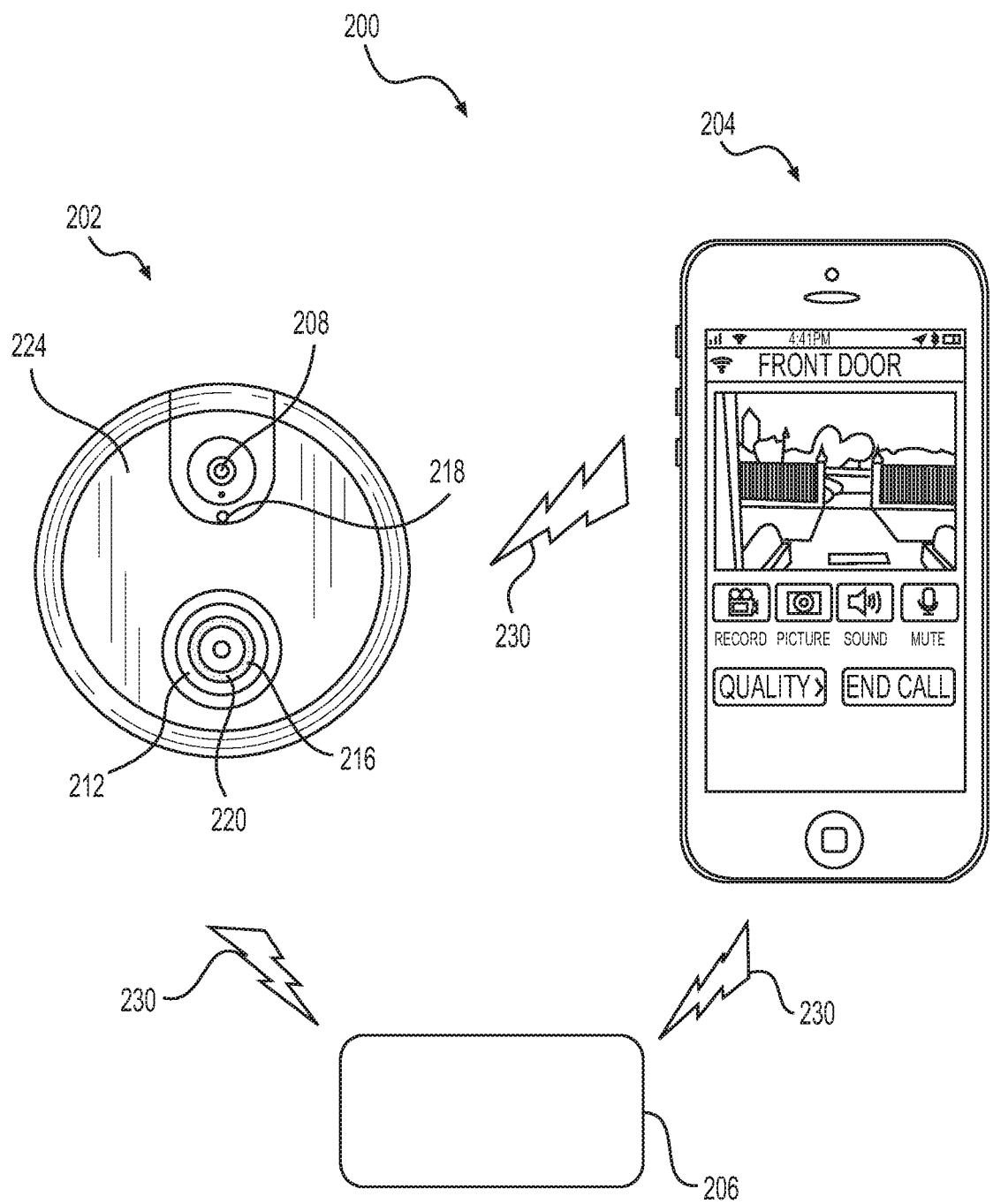
FIG. 1 illustrates a front view of a communication system, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Buildings often include one or more entryways for people to enter the building. Oftentimes when a person enters the building, one or more events may occur. For example, when a resident enters a home, the resident may illuminate one or more interior lights, adjust the temperature inside the home, energize an appliance, such as a television, or perform any different number of events. Presently, the person who has entered the building often manually performs the one or more events. It should be appreciated that the term "building" can be used to describe any physical structure capable of providing shelter to people, such as a home, apartment, townhome, mobile home, office building, warehouse, cabin, houseboat, nursing home, athletics facility, library, school, theater, shopping mall, and the like.

Many buildings are equipped with a doorbell that is attached to the building adjacent the one or more entryways. Various embodiments described herein provide a doorbell, or security system 202, that may detect the presence of the person at the one or more entryways. In response to the security system 202 detecting the presence of the person, the security system 202 may automatically trigger or initiate a series of events inside and outside of the building. For example, the series of events may include control of lighting; adjusting temperature via a heating, ventilation and air conditioning system (HVAC); activating appliances; and fastening or unfastening security locks of gates, doors and other systems. As such, the security system 202 may provide improved convenience, comfort, energy efficiency and security.

System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

FIG. 1 illustrates a front view of a communication system embodiment. The communication system 200 can include a security system 202 (e.g. a doorbell) and a computing device 204. Although the illustrated security system 202 includes many components in one housing, several security system embodiments include components in separate housings. The security system 202 can include a camera assembly 208 and a doorbell button 212. The camera assembly 208 can be a video camera, which in some embodiments is a webcam.

The security system 202 can include a diagnostic light 216 and a power indicator light 220. In some embodiments, the diagnostic light 216 is a first color (e.g., blue) if the security system 202 and/or the communication system 200 is connected to a wireless Internet network and is a second color (e.g., red) if the security system 202 and/or the communication system 200 is not connected to a wireless Internet network. In some embodiments, the power indicator 220 is a first color if the security system 202 is connected to a power source. The power source can be power supplied by the building to which the security system 202 is attached. In some embodiments, the power indicator 220 is a second color or does not emit light if the security system 202 is not connected to the power source. In some embodiments, the button 212 may be configurable to enable the user to sound a chime.

The security system 202 (e.g., a doorbell) can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The security system 202 can be electrically coupled to a power source, such as wires electrically connected to a building's electrical power system. In some embodiments, the security system 202 includes a battery for backup and/or primary power.

Wireless communication 230 can enable the security system 202 (e.g., a doorbell) to communicate with the computing device 204. Some embodiments enable communication via cellular and/or WiFi networks. Some embodiments enable communication via the Internet. Several embodiments enable wired communication between the security system 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202 can initiate voice calls or send text messages to a computing device 204 (e.g., a smartphone, a desktop computer, a tablet computer, a laptop computer).

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
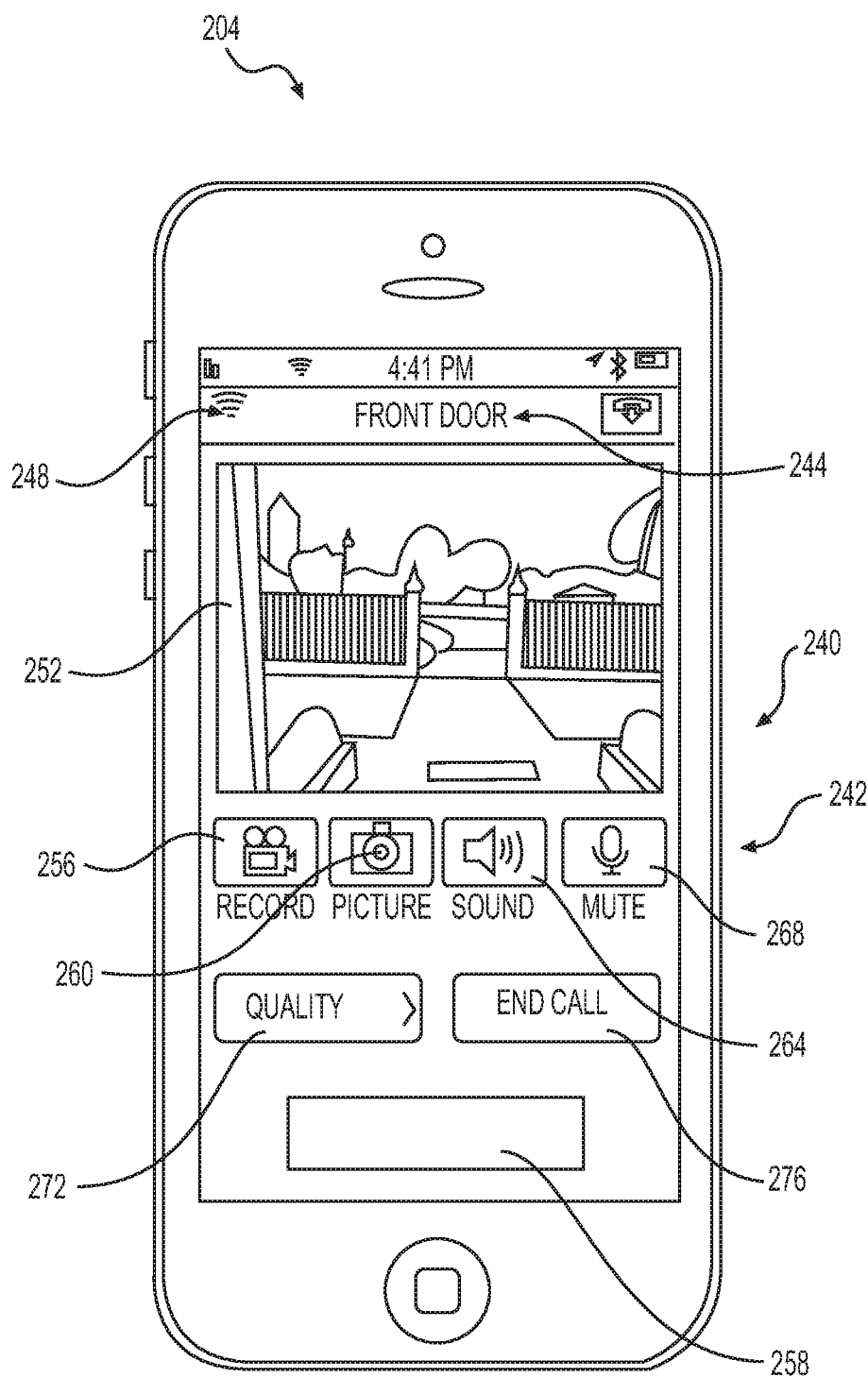
FIG. 2 illustrates a computing device running software, according to some embodiments.

FIG. 2 illustrates a computing device 204 running software. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device is in communication with a security system, the Internet, and/or a cellular network. The connectivity indicator 248 can alert the user if the computing device 204 has lost its connection with the security system 202; the security system 202 has been damaged; the security system 202 has been stolen; the security system 202 has been removed from its mounting location; the security system 202 lost electrical power; and/or if the computing device 204 cannot communicate with the security system 202. In some embodiments, the connectivity indicator 248 alerts the user of the computing device 204 by flashing, emitting a sound, displaying a message, and/or displaying a symbol.

In some embodiments, if the security system 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the security system 202 and the computing device. In some embodiments, information from the security system 202 is stored by the remote server 206. In several embodiments, information from the security system 202 is stored by the remote server 206 until the information can be sent to the computing device 204, uploaded to the computing device 204, and/or displayed to the remotely located person via the computing device 204. The remote server 206 can be a computing device that stores information from the security system 202 and/or from the computing device 204. In some embodiments, the remote server 206 is located in a data center.

In some embodiments, the computing device 204 and/or the remote server 206 attempts to communicate with the security system 202. If the computing device 204 and/or the remote server 206 is unable to communicate with the security system 202, the computing device 204 and/or the remote server 206 alerts the remotely located person via the software, phone, text, a displayed message, and/or a website. In some embodiments, the computing device 204 and/or the remote server 206 attempts to communicate with the security system 202 periodically; at least every five hours and/or less than every 10 minutes; at least every 24 hours and/or less than every 60 minutes; or at least every hour and/or less than every second.

In some embodiments, the server 206 can initiate communication to the computer device 204 and/or to the security system 202. In several embodiments, the server 206 can initiate, control, and/or block communication between the computing device 204 and the security system 202.

In several embodiments, a user can log into an "app," website, and/or software on a computing device (e.g., mobile computing device, smartphone, tablet, desktop computer) to adjust the security system settings discussed herein.

In some embodiments, a computing device can enable a user to watch live video and/or hear live audio from a security system due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the security system 202. The image 252 can be taken by the camera assembly 208 and stored by the security system 202, server 206, and/or computing device 204. The user interface 240 can include a recording button 256 to enable a user to record images, videos, and/or sound from the camera assembly 208, microphone of the security system 202, and/or microphone of the computing device 204.

In several embodiments, the user interface 240 includes a picture button 260 to allow the user to take still pictures and/or videos of the area near and/or in front of the security system 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button, which can allow a user to select the quality and/or amount of the data transmitted from the security system 202 to the computing device 204 and/or from the computing device 204 to the security system 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the security system 202 and the computing device 204. In some embodiments, the termination button 276 ends the ability of the person located near the security system 202 (i.e., the visitor) to hear and/or see the user of the computing device 204, but does not end the ability of the user of the computing device 204 to hear and/or see the person located near the security system 202.

In some embodiments, a button 276 is both an answer button (to accept a communication request from a visitor) and is a termination button (to end communication between the security system 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system and to stop emitting sounds recorded by the security system.

In some embodiments, the user interface 240 opens as soon as the security system detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a security system. The methods can include causing the user interface to display on a remote computing device 204 due to the detection of the visitor (e.g., with or without user interaction). The methods can include displaying video from the security system and/or audio from the security system before the user accepts two-way communication with the visitor. The methods can include displaying video from the security system and/or audio from the security system before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the security system before opening a means of two-way communication with the visitor.

In some embodiments, the software includes means to start the video feed on demand. For example, a user of the computing device might wonder what is happening near the security system 202. The user can open the software application on the computing device 204 and instruct the application to show live video and/or audio from the security device 202 even if no event near the security system 202 has triggered the communication.

In several embodiments, the security device 202 can be configured to record when the security device 202 detects movement and/or the presence of a person. The user of the computing device 204 can later review all video and/or audio records when the security device 202 detected movement and/or the presence of a person.

Referring now to FIG. 1, in some embodiments, the server 206 controls communication between the computing device 204 and the security system 202, which can be a doorbell with a camera, a microphone, and a speaker. In several embodiments, the server 206 does not control communication between the computing device 204 and the security system 202.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the security system 202 can store information and statistics regarding visitors and usage.

Figure 3:
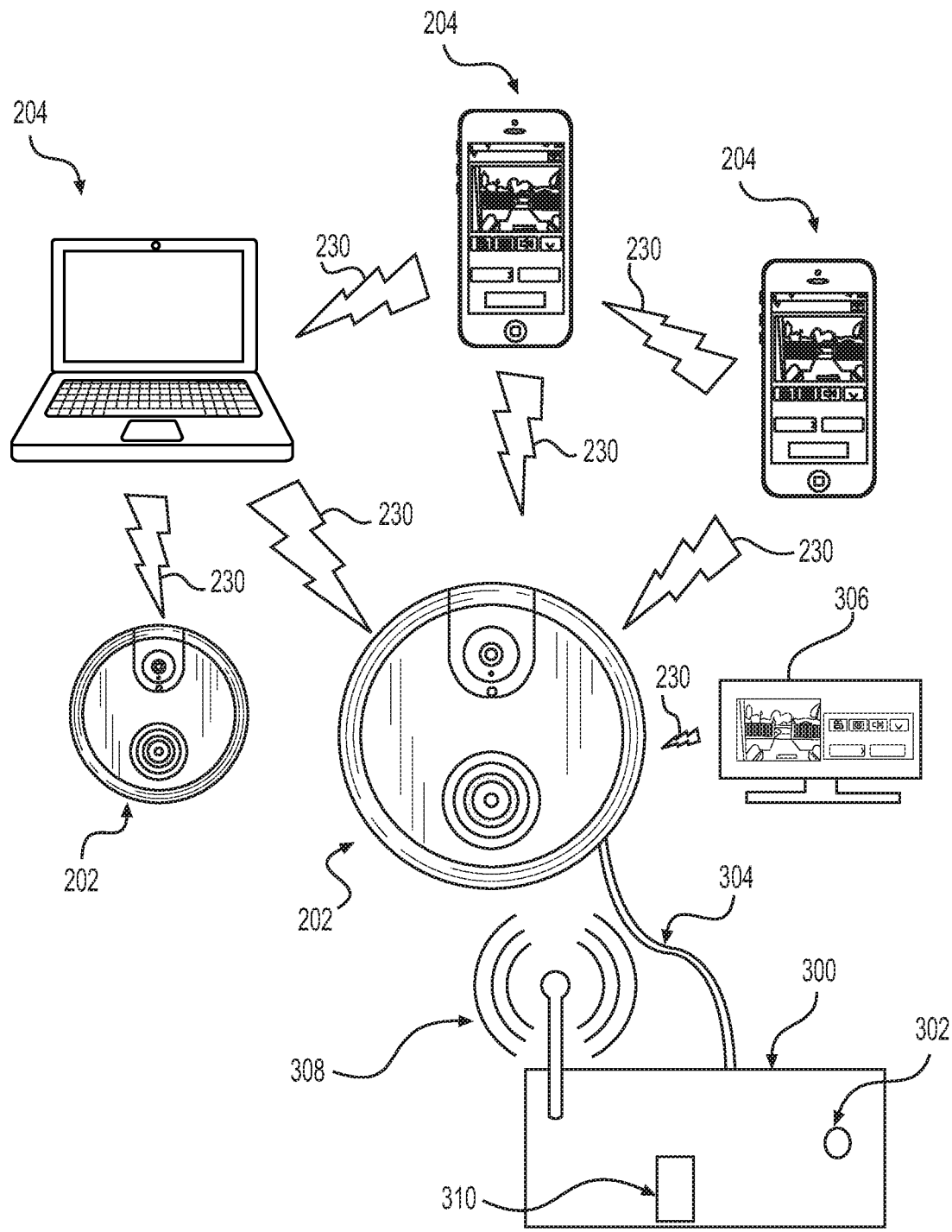
FIG. 3 illustrates an embodiment in which a security system is connected to a building, according to some embodiments.

FIG. 3 illustrates an embodiment in which a security system 202 is connected to a building 300, which can include an entryway 310 that has a door 254. A door lock 250 can be configured to lock and unlock the door 254. Electrical wires 304 can electrically couple the security system 202 to the electrical system of the building 300 such that the security system 202 can receive electrical power from the building 300.

A wireless network 308 can allow devices to wirelessly access the Internet. The security system 202 can access the Internet via the wireless network 308. The wireless network 308 can transmit data from the security system 202 to the Internet, which can transmit the data to remotely located computing devices 204. The Internet and wireless networks can transmit data from remotely located computing devices 204 to the security system 202. In some embodiments, a security system 202 connects to a home's WiFi.

As illustrated in FIG. 3, one computing device 204 (e.g., a laptop, a smartphone, a mobile computing device, a television) can communicate with multiple security systems 202. In some embodiments, multiple computing devices 204 can communicate with one security system 202.

In some embodiments, the security system 202 can communicate (e.g., wirelessly 230) with a television 514, which can be a smart television. Users can view the television 514 to see a visitor and/or talk with the visitor.

Triggering Appliances

Generally, it should be appreciated that the security system 202 may serve as the gateway to the building 300. In this regard, when the security system 202 detects an indication of a presence of a visitor 540 or an indication of a location of the visitor 540, the security system 202 may then initiate an event or series of events inside or outside the building 300.

In order to initiate the event or series of events, the security system 202 may interface with any type of building automation platform, building automation device, remote computing device 204, and/or any other type of connected device or appliance. The security system 202 may interface with any of the aforementioned platforms and devices via a software-to-software interface, such as an application-programming interface (API). In this regard, the visitor 540 and user only see the security system 202, but do not see that behind the scenes, many various applications and software interfaces are working together using the APIs. In this manner, security system 202 may effectuate a seamless integration because the visitor 540 and user never notice when software functions are handed from one application to another.

As such, the security system 202 may be connected with any number of various appliances, independently or through a platform, such as the home automation platform. For instance, the security system 202 may be connected to any appliance, such as lights, heating, air conditioning, ventilation, lock (e.g. a smart lock), stereo, television, camera (e.g. IP camera), digital video recorder (DVR), oven, clothes washer, clothes dryer, combo washer dryer, dishwasher, shower, motion sensor, noise maker, domestic robot (e.g. a vacuum cleaner), computer, toaster, automobile, digital media player (such as an Apple TV®, Roku®, etc.), or the like. In general, it should be appreciated that the appliance may be any type of portable or semi-portable device capable of accomplishing a task associated with the building 300, such as an air ionizer, aroma lamp, attic fan, can opener, ceiling fan, clothes iron, compactor, convection heater, cooker, dehumidifier, exhaust hood, fireplace, garbage disposal, hair dryer, hair iron, humidifier, icebox, microwave, electric mousetrap, oven, patio heater, radiator, refrigerator, sewing machine, stove, water boiler, window fan, or the like.

Many embodiments may include using the security system 202 to broadcast an API to actuate the appliance and/or platform (e.g. first appliance, second appliance, or plurality of appliances) to produce any desirable outcome. For example, in some embodiments, the security system 202 may actuate a robotic vacuum cleaner to return to its docking station. In some embodiments, the security system 202 may illuminate an outdoor light 518 located within 10 feet of the security system 202. Accordingly, in some embodiments, in response to the security system 202 detecting that the visitor 540 is no longer present at the entryway 310, the security system 202 may de-energize the outdoor light 518.

To further illustrate the possible outcomes that may be initiated by the security system 202, in response to the security system 202 detecting the visitor 540, some embodiments may include using the security system 202 to actuate a microwave oven to heat food located within the microwave oven. As well, some embodiments of the security system 202 may include using the security system 202 to pause an image displayed on a screen of a television 514.

Furthermore, the security system 202 can be used to actuate or control any combination of appliances at predetermined time intervals. For example, in response to detecting the presence of the visitor 540, embodiments may include using the security system 202 to illuminate the outdoor light 518 at time=X, using the security system to pause the image on the television 514 at time=Y, and using the security system to actuate the clothes washer at time=Z. It should be appreciated that times X, Y and Z may be any time interval or time of day. Generally, the security system 202 may actuate the platform and/or appliance to perform any event or series of events associated with the building 300 and/or user of the building 300. Moreover, the event(s) may occur in any order and at any time interval. As well, it should be appreciated that the term "actuating" may comprise energizing, de-energizing, commanding, activating, deactivating, pausing, putting to sleep, adjusting, initiating, vibrating, or the like.

The security system 202 itself may serve as the automation nerve center of the building 300. For example, the security system 202 may initiate a complex reaction of events to occur in response to detecting the visitor 540. For example, in response to the security system 202 detecting the visitor 540, embodiments may include using the security system 202 to actuate a front hallway motion sensor, whereby in response to the front hallway motion sensor detecting an indication of a presence of the visitor 540, the kitchen lights may illuminate. Furthermore, in response to the kitchen lights illuminating, the security system 202 may actuate a kitchen appliance, such as the oven. In this regard, the security system 202 may serve as the platform or brains of the entire building automation, and the security system 202 may control any appliance based on any logic as desired by the user.

Aside from being connected to such devices as a particular appliance, or the entire home automation network, the security system 202 may interface or be connected to the remote computing device 204. For example, the remote computing device 204 may be a smartphone, which another user carries on her person. For example, upon the security system 202 detecting the visitor 540, the method may include using the security system 202 to send a text message to the smartphone to alert the user of the visitor's presence at the building 300 or the visitor's location with respect to the building 300. The text message might include any type of message to the user, perhaps identifying the visitor 540, such as "Jane is home," or "Jane will be home in 5 minutes," or "an unknown man is outside the back door."

In another example, the remote computing device 204 is a smart watch, and the method includes using the security system 202 to send a command to the smart watch to initiate a notification, such as a vibration or an audible noise to alert the user of the visitor's presence at the building 300 or the visitor's location with respect to the building 300. Generally, the security system 202 may actuate the remote computing device 204 to initiate any type of event to notify the user of the visitor's location.

Detecting a Single Visitor

Figure 10:
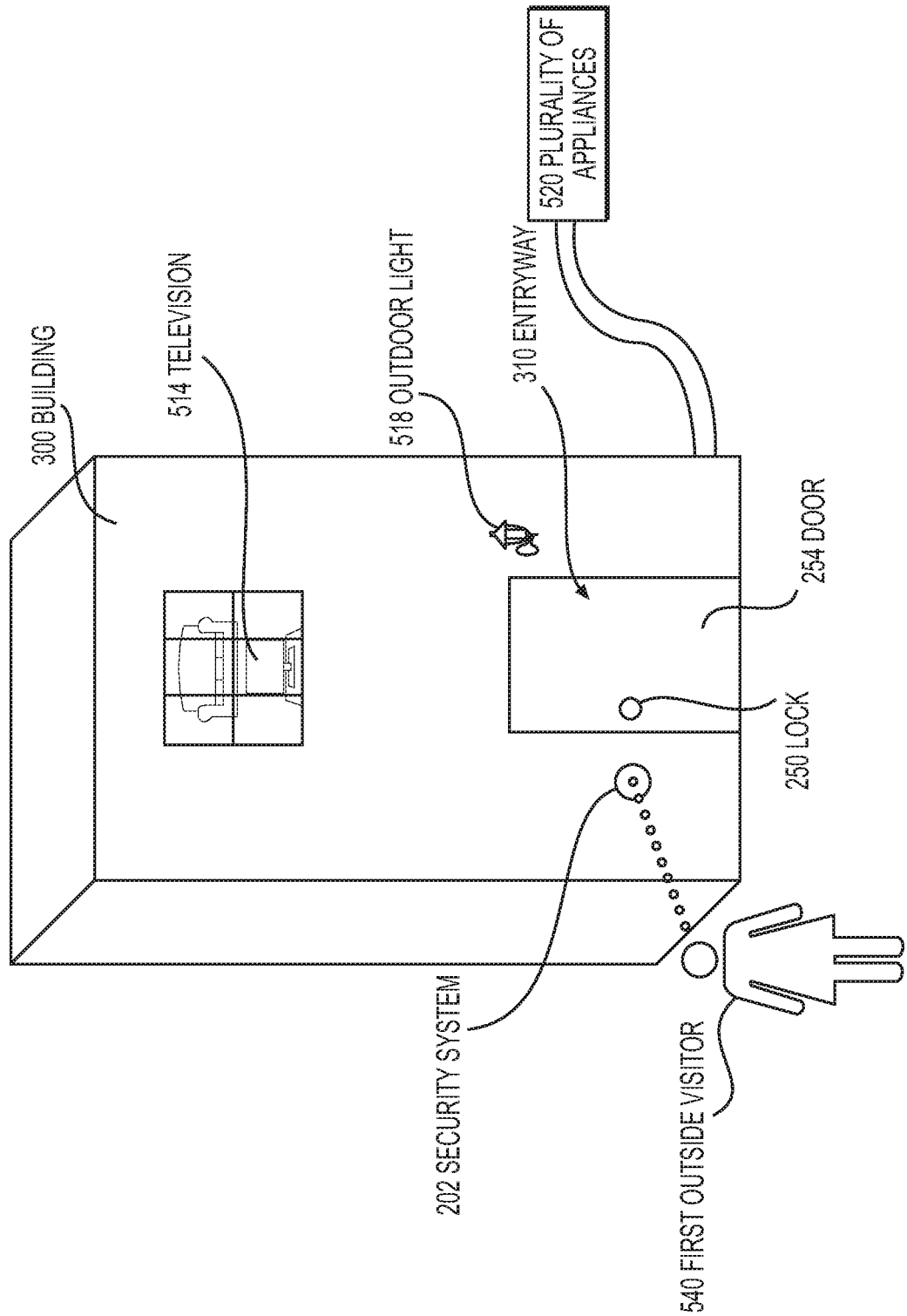
FIG. 10 illustrates a security system detecting a presence of a visitor, according to some embodiments.
Figure 11:
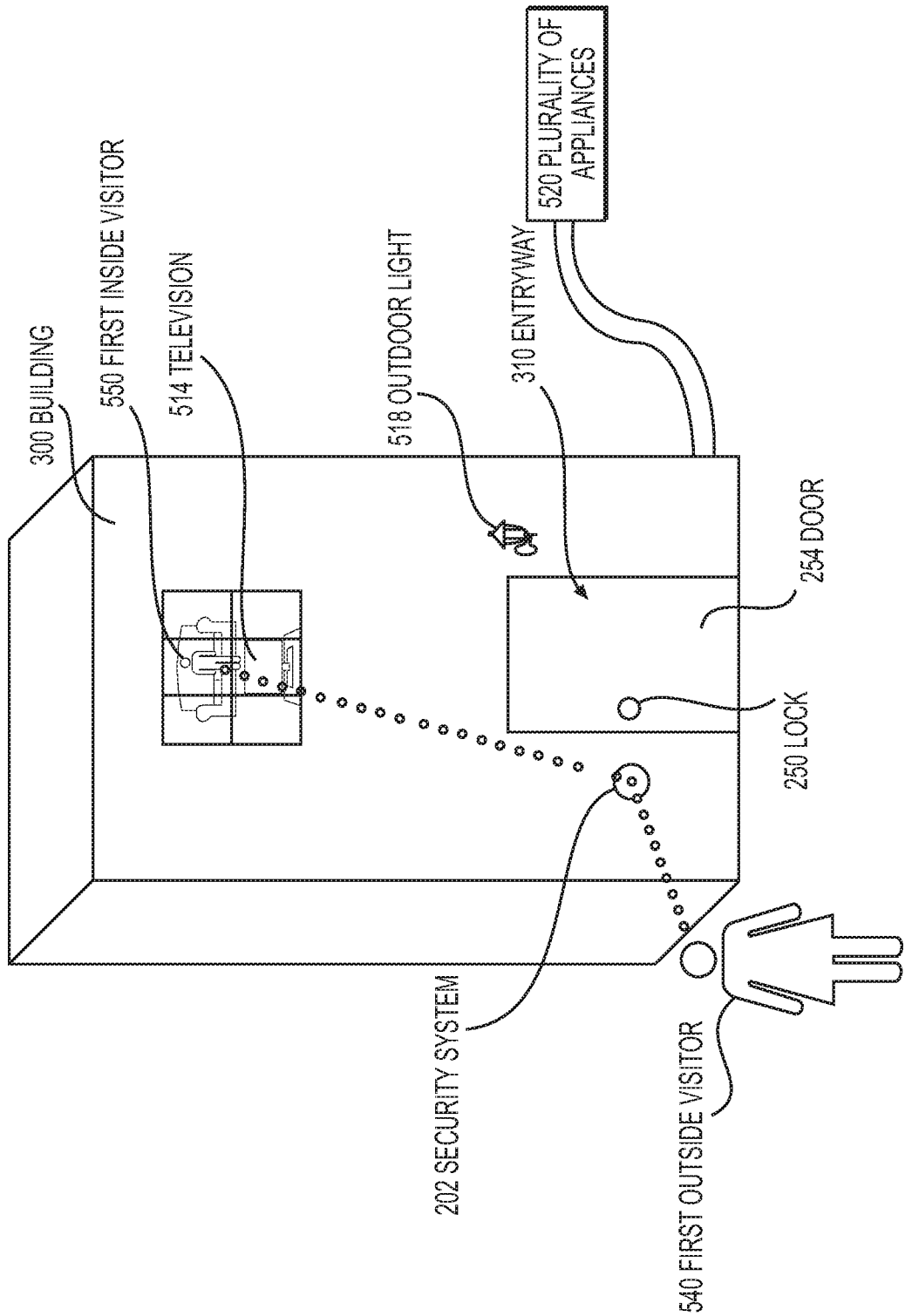

Many embodiments may utilize the security system 202 to detect a presence of a visitor, such as a first outside visitor 540. With reference to FIGS. 4 and 10, some embodiments may use the security system 202 to detect the presence of the first visitor 540 while the visitor 540 is located outside of the building 300 (at step 2000). It should be appreciated that the visitor 540 may be located outside the building adjacent to an entryway 310 having a door 254. Accordingly, the door 254 may include a lock 250 that is configured to fasten the door 254 to inhibit unauthorized entry into the building 300.

In response to detecting the presence of the visitor 540, embodiments may include using the security system 202 to actuate a first appliance associated with the building 300 (at step 2002). For example, the security system 202 may actuate the first appliance and/or appliances as detailed per an appliance record associated with the visitor 540. The appliance record may be predetermined by the visitor 540, or another person. The appliance record may be configured by the person via software on a remote computing device 204, such as an application on a smartphone or a tablet, and the appliance record may be stored on a remote database, such as the remote computing device 204.

The appliance record may include a list of appliances to actuate upon detecting an indication of a presence of the first outside visitor 540. Furthermore, the appliance record may include a specific configuration for each appliance. For example, with regards to the first visitor 540, the appliance record may include instructions to actuate television 514, configure the volume to level 10, and set the television 514 to receive a signal from channel 11. However, it should be appreciated that the appliance record may include any type of logic or commands to initiate an appliance to perform a task.

Moreover, the appliance record may also prioritize the visitor's appliances in the order that she would like them actuated upon entering or exiting the building 300. Accordingly, in the event that multiple visitors are present at the building 300, the security system 202 may consult various appliance records to determine which appliances to actuate. For example, an appliance may currently be unavailable due to occupation by another visitor. In this event, the security system 202 may be able to determine an activation priority list of appliance(s) and may actuate the respective appliance(s) of the visitor(s) accordingly.

Figure 8:
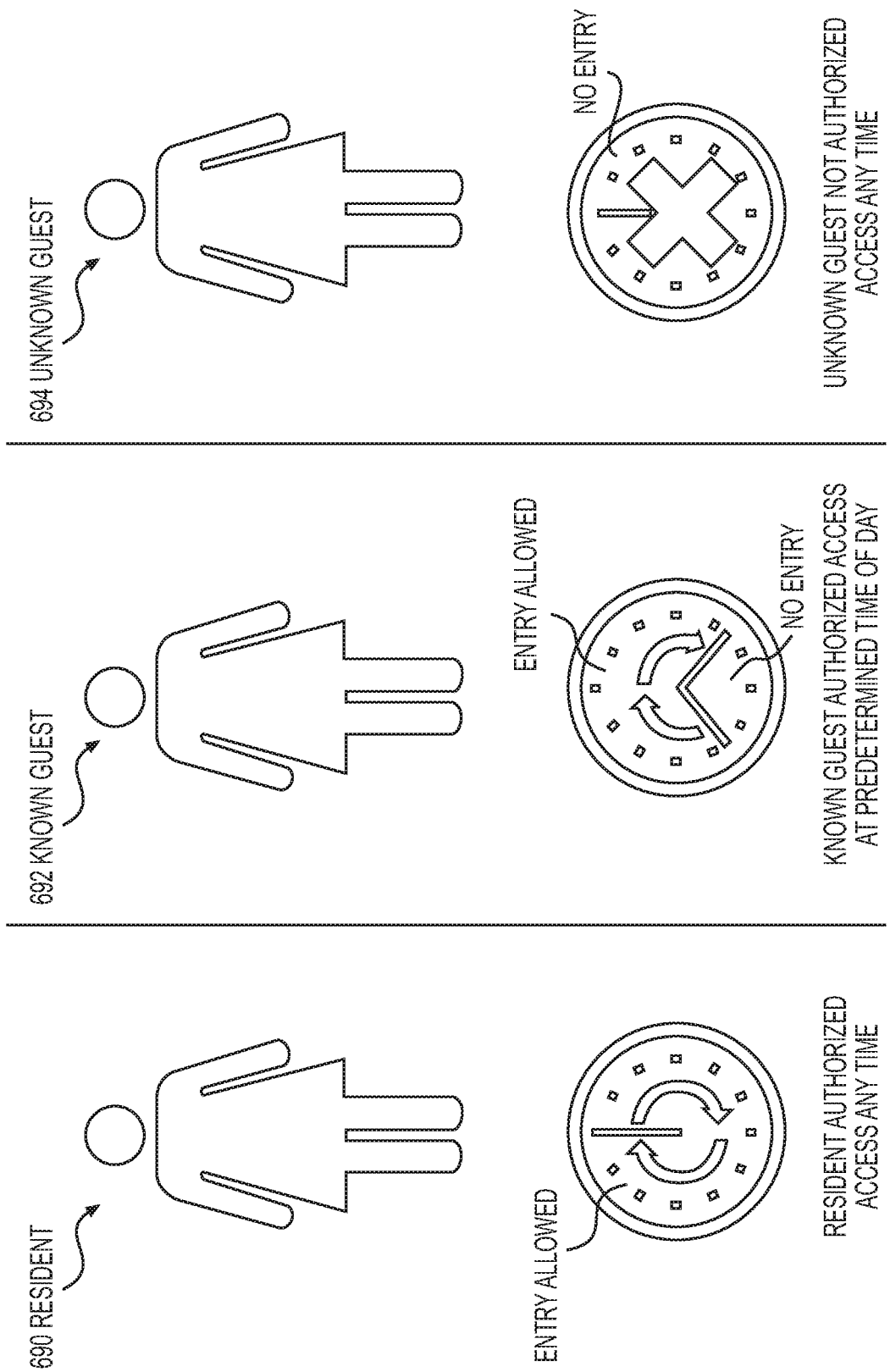
FIG. 8 illustrates different visitor types, according to some embodiments.

Many embodiments may also utilize the security system 202 to identify the visitor 540 and/or determine whether the visitor 540 is a resident 690, known guest 692, or unknown guest 694. As shown in FIG. 8, the resident 690 may be a person who lives at the building 300, works at the building 300, or is authorized access to the building 300. In this regard, the resident 690 may be authorized access to the building 300 at anytime.

The known guest 692 may be a person who does not live or work at the building 300, but is still allowed access to the building 300 at a predetermined time of day. For example, the known guest 692 may be a close colleague of the resident 690, or perhaps a delivery person who makes routine visits to the building 300. In this regard, the known guest 692 may be allowed access to the building 300 between sunrise and sunset, sunset and sunrise, or during specified time intervals, such as from 0900 hours to 1700 hours, or from 1800 hours to 2100 hours, etc. In general, it should be appreciated that the known guest 692 may be allowed access to the building 300 during any desired time period. As well, it should be appreciated that the predetermined time period may from 0000 hours to 2400 hours (i.e. all day).

With continued reference to FIG. 8, the unknown guest 694 may be a person who does not live or work at the building 300 and is not authorized access to the building 300. For example, the unknown guest 694 may be a solicitor, or any person whom the resident 690 does not know or wishes to prohibit access to the building 300. As such, the unknown guest 694 may not be authorized access into the building at anytime. Although, in some examples, the unknown guest 694 may be provided access during a limited timeframe, such as from 0900 hours to 1500 hours. For example, if the building 300 is a business with no front door attendant, the unknown guest 694 may be allowed entry into the building 300 during business hours.

The determination of whether the visitor 540 is a resident 690, known guest 692, or unknown guest 694 may provide the security system 202 with guidance in regards to whose appliances to actuate first, second, third, etc. In terms of prioritizing visitor types, it should be appreciated that the residents' appliances take priority over those of the known guest 692 and unknown guest 694. For example, if both the resident 690 and the known guest 692 are present at the building 300 and each have a television 514 as their top appliance, the security system 202 will actuate the television 514 according to the preferences of the resident 690. As well, it should be appreciated that the known guest 692 takes priority over the unknown guest 694.

It should also be appreciated that appliance records associated with the resident 690 and known guest 692 may include appliances the resident 690 and known guest 692 prefer to de-energize. For example, the appliance record of the resident 690 may include a command to de-energize an appliance, such as a stereo. Accordingly, if a known guest 692 or unknown guest 694 is present inside the building 300 and the guest has the stereo energized, in response to the security system 202 detecting the presence of the resident 690, the method may include using the security system 202 to de-energize the stereo. It should be appreciated that the appliance may be any type of appliance that the resident 690 may wish to de-energize. Furthermore, it should be appreciated that the appliance record of the resident 690 may include a command to re-configure the appliance to a different setting. For example, in response to the security system 202 detecting the presence of the resident 690, the method may include using the security system 202 to re-configure the stereo to change the volume from a volume level 10 to a volume level 2. It should be appreciated that this is one example and that any appliance may be re-configured according to the resident's preferences.

Furthermore, upon determining the type of visitor (i.e. resident 690, known guest 692, or unknown guest 694), the security system 202 may be configured to move the lock 250 to a locked position or an unlocked position and thereby grant or deny access based upon the type of visitor. Accordingly, upon determining that the visitor 540 is a resident 690, known guest 692, or unknown guest 694, the security system 202 may actuate the lock 250 to perform different events.

For example, in response to detecting the presence of the resident 690, the method may include using the security system 202 to determine whether the lock 250 is in a locked position or an unlocked position. Because the resident 690 may be allowed full access to the building 300, in response to determining the lock 250 is in the locked position, the security system 202 may actuate the lock 250 to move to the unlocked position. Accordingly, in response to determining the lock 250 is in the unlocked position, the security system 202 may cause the lock 250 to stay in the unlocked position; thus, granting the resident 690 access to the building 300.

However, it should be appreciated that in some embodiments, in response to detecting the presence of the resident 690, the security system 202 may cause the lock 250 to move to the locked position. For example, in the situation that the security system 202 detects an unknown guest 694 with the resident 690, the security system 202 may cause the lock 250 to move to the locked position for security measures. However, it should be appreciated that the security system 202 may cause the lock 250 to move to the locked position for any reason in response to detecting the presence of the resident 690.

Furthermore, in response to detecting the presence of the known guest 692, the security system 202 may be used to determine whether a present time of day is within the predetermined time of day (i.e. when the known guest 692 is permitted entry) and whether the lock 250 is in the locked position or the unlocked position. Accordingly, in response to determining the present time of day is within the predetermined time of day and the lock 250 is in the locked position, the method may include using the security system 202 to actuate the lock 250 to move to the unlocked position. As well, in response to determining the present time of day is not within the predetermined time of day and the lock 250 is in the unlocked position, the method may include using the security system 202 to move the lock 250 to the locked position. However, it should be appreciated that the lock 250 may be configured to move to any position. For example, in response to determining the present time of day is within the predetermined time of day and in response to detecting the known guest 692, the security system 202 may cause the lock 250 to move to the locked position for security purposes.

Moreover, in response to detecting the presence of the unknown guest 694, the method may include using the security system 202 to determine whether the lock 250 is in the locked position or the unlocked position. In response to determining the lock 250 is in the unlocked position, the method may also include using the security system 202 to move the lock 250 to the locked position. Accordingly, in response to determining the lock 250 is in the locked position, the security system 202 may cause the lock 250 to stay in the locked position; thus, preventing the unknown guest 694 from gaining access to the building 300. However, as previously mentioned, because the unknown guest 694 may be provided access during a limited timeframe, the security system 202 may cause the lock 250 to move to or stay in the unlocked position to thereby allow access to the unknown guest 694.

Figure 9:
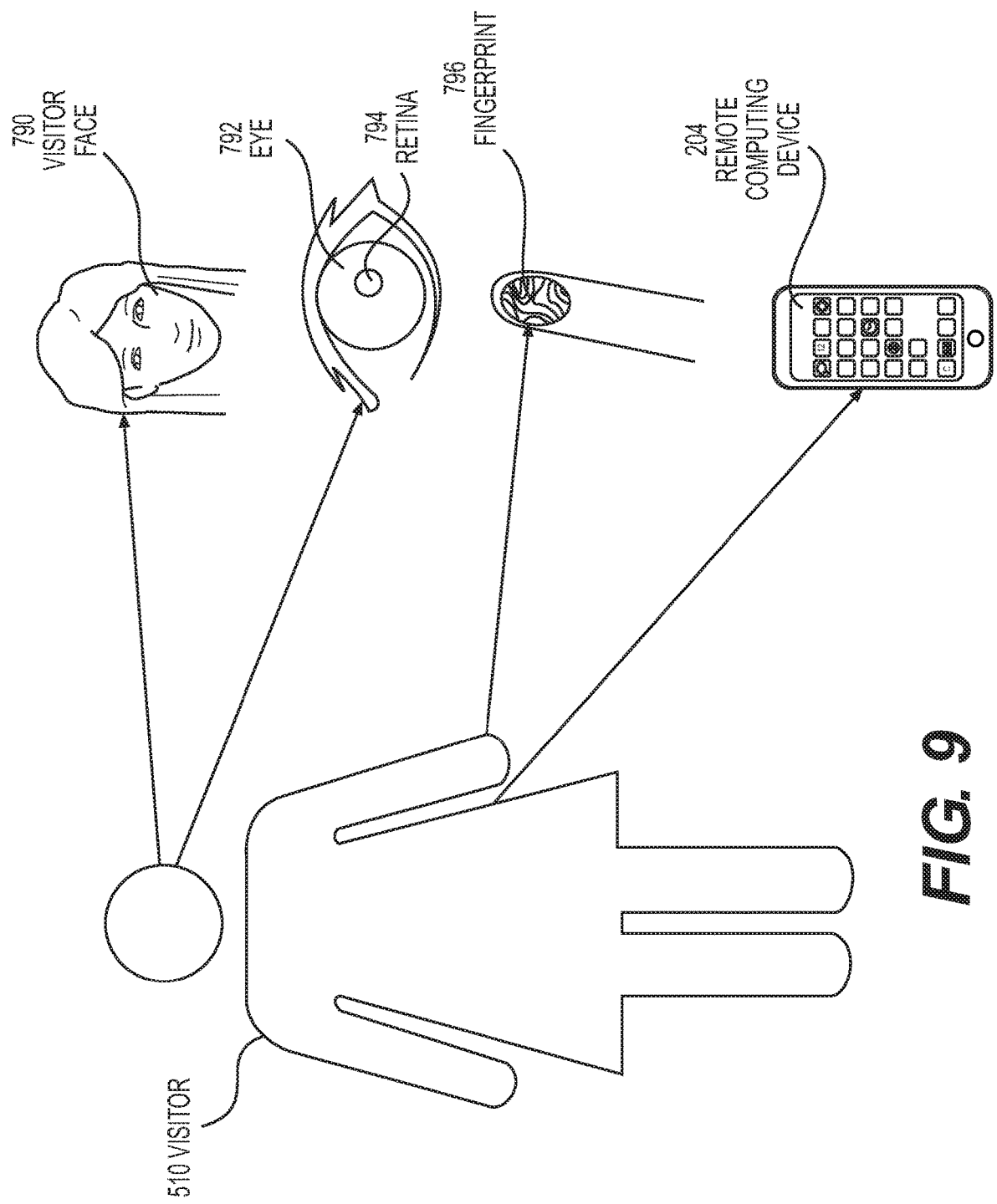
FIG. 9 illustrates various identifying characteristics of a visitor, according to some embodiments.

The security system 202 may implement any number of detection mechanisms to determine whether the visitor 540 is the resident 690, known guest 692, or unknown guest 694. As illustrated in FIG. 9, the security system 202 may use identifying characteristics associated with the visitor 540, such as a visitor's face 790, eye 792, retina 794, fingerprint 796, or the like, to thereby identify the visitor 540 via facial recognition, retina scanning, iris recognition, fingerprint recognition, and/or the like.

For example, to implement any such identification techniques, such as facial recognition, etc., the security system 202 may include a camera assembly 208 that can be configured to visually identify visitors through machine vision and/or image recognition. The camera assembly 208 can take an image of the visitor, such as the visitor's face 790. In turn, software run by any portion of the system can then compare select facial features from the image to a facial database. In some embodiments, the select facial features include dimensions based on facial landmarks. For example, the distance between a visitor's eyes; the triangular shape between the eyes and nose; and the width of the mouth can be used to characterize a visitor and then to compare the visitor's characterization to a database of characterization information to match the visitor's characterization to an identity (e.g., an individual's name, authorization status, and classification). Some embodiments use three-dimensional visitor identification methods.

Some embodiments may include fingerprint recognition to verify the identity of the visitor 540. In this manner, the visitor 540 can place her finger over the camera assembly 208 to enable the system 200 to detect her fingerprint 796. Some security system 202 embodiments include a fingerprint reader, which can enable the system to compare the fingerprint of the visitor 540 to a database of fingerprints to identify and/or classify the visitor 540 as a resident 690, known guest 692, or unknown guest 694. The database of fingerprints can be created by the user or visitor and/or can include a database of fingerprints from a law enforcement agency (e.g., a database of criminals).

Furthermore, the fingerprint reader can use any suitable algorithm including minutia and pattern algorithms. The fingerprint reader can analyze fingerprint patterns including arch patterns, loop patterns, and whorl patterns. The fingerprint reader can include any suitable fingerprint sensor including optical, ultrasonic, passive capacitance, and active capacitance sensors. The fingerprint reader can be integrated into the outer housing 224 of the security system 202, which can be mounted within 7 feet of a door 254 or entryway 310 of the building 300. In some embodiments, the security system 202 may be mounted in an entryway 310. Some methods include mounting a security system 202 in an entryway 310 of the building 300. It should be appreciate that the fingerprint reader can be integrated into the security system button 212. In this manner, pressing the security system button 212 can enable the fingerprint reader to analyze the fingerprint of the visitor 540.

The security system 202 may also determine the visitor's identity by detecting a remote computing device 204 associated with the visitor 540. For example, as the visitor 540 approaches the building 300, the security system 202 may detect the remote computing device 204, such as a smartphone. In this manner, the security system 202 may detect an indication of a presence of the visitor 540 and/or determine the identity of the visitor 540.

In order to detect the presence of the remote computing device 204, the security system 202 may use technology such as Bluetooth, Wi-Fi, radio-frequency identification (RFID), infrared, cellular telephone transmissions, near field communication (NFC), Global Positioning System (GPS), and/or the like. Generally, it should be appreciated that the security system 202 may detect the presence of the remote computing device 204 via any digital communication mechanism configured to identify the remote computing device 204 and/or identify the person to which the remote computing device 204 may be associated.

For example, in some embodiments, the security system 202 may utilize Bluetooth to detect a smartphone enabled in Bluetooth discover mode. The security system 202 may be paired with the smartphone via any known pairing mechanism, such as legacy pairing, secure simple pairing (SSP), etc. Upon the security system 202 being paired with the smartphone, the security system 202 may determine the identity of the smartphone and thus determine the visitor 540 that the smartphone is associated. Accordingly, the security system 202 may determine whether the smartphone is associated with a resident 690, known guest 692, or unknown guest 694. Therefore, by identifying the smartphone, the security system 202 may in turn determine the identity of the visitor 540, as well as determine whether the visitor 540 is a resident 690, known guest 692, or unknown guest 694.

It should also be appreciated that the remote computing device 204 may be any type of digital device associated with the visitor 540. In many embodiments, the remote computing device 204 may be a smartphone, smart watch, tablet, laptop, e-reader, wearable device, and/or the like.

Detecting Multiple Visitors

Many embodiments include a method for using the security system 202 to detect a presence of an outside visitor 540 and a presence of an inside visitor 550. Referring to FIGS. 5 and 11-13, the method may include using the security system 202 to detect the presence of the outside visitor 540 while the outside visitor 540 is located outside of the building 300 to which the security system 202 is attached (at step 2004). Furthermore, in response to detecting the presence of the outside visitor 540, the method may include using the security system 202 to detect the presence of the inside visitor 550 while the inside visitor 550 is located inside the building 300 (at step 2006).

Some embodiments may also include detecting a visitor type of the outside visitor 540 and inside visitor 550. As such, the method may include using the security system 202 to determine whether the outside visitor 540 is a first resident, first known guest, or first unknown guest. Accordingly, some methods may include using the security system 202 to determine whether the inside visitor 550 is a second resident, second known guest, or second unknown guest. The first resident or second resident may be authorized access to the building 300 any time of day. The first known guest or second known guest may be authorized partial access to the building 300. In other words, partial access may comprise unlocking the lock 250 at predetermined times of the day. As well, the first unknown guest or second unknown guest may not be authorized access to the building 300 at anytime.

The security system 202 may actuate different events based upon the various combinations of whether the outside and inside visitors 540 and 550 are residents, known guests, and/or unknown guests. In many embodiments, priority may be given to the resident(s) over the known guest(s) and/or unknown guest(s). For example, in response to determining the inside visitor 550 is the second resident and the outside visitor 540 is the first known guest or first unknown guest, the method may further include using the security system 202 to actuate at least one selected appliance from an appliance record associated with the inside visitor 550. Additionally, in response to determining the outside visitor 540 is the first resident and the inside visitor 550 is the second known guest or second unknown guest, the method may further include using the security system 202 to actuate at least one selected appliance from an appliance record associated with the outside visitor 540.

As well, the situation may arise when both the outside visitor 540 and the inside visitor 550 are residents. In response to determining the outside visitor 540 is the first resident and the inside visitor 550 is the second resident, the method may include using the security system 202 to determine whether a first appliance record associated with the outside visitor 540 is ranked higher than a second appliance record associated with the inside visitor 550. In other words, the first appliance record associated with the first resident, or outside visitor 540, may be superior to the second appliance record associated with the second resident, or inside visitor 550. Accordingly, the first appliance record may take priority over the second appliance record and thus, the method may include using the security system 202 to actuate at least one appliance from the first appliance record.

The first and second residents may comprise any type of resident whereby one resident's appliance preferences are superior to the other. For example, the first appliance record may be associated with a boss, while the second appliance record may be associated with an employee. As well, the first appliance record may be associated with a parent, while the second appliance record may be associated with a child. As well, it should be appreciated that the roles may be reversed, whereby the second appliance record associated with the second resident may take priority over the first appliance associated with the first resident.

Furthermore, the situation may arise whereby the first and second appliance records are ranked equally, meaning neither record is superior (i.e. takes priority) over the other. In this circumstance, many embodiments may compare the first and second appliance records and determine whether there are appliances defined on one record, but not on the other, and vice versa. Accordingly, the method may include using the security system 202 to actuate appliances that are only defined on one respective appliance record. If appliances are defined on both appliance records, the method may include using the security system 202 to compare the internal rankings of each appliance within each specific record. For example, if a television 514 is present in both appliance records, but the television 514 is ranked first on the first appliance record and the television 514 is ranked fourth on the second appliance record, the security system 202 may actuate the television 514 in accordance with the preferences defined in the first appliance record.

As well, even if the same appliance is defined in both appliance records, many embodiments may use the security system 202 to determine whether the same appliance is currently energized or de-energized. For example, the method may include using the security system 202 to determine whether an appliance of the first appliance record is defined in the second appliance record. In response to determining the appliance of the first appliance record is defined in the second appliance record, the method may include using the security system 202 to determine whether the appliance is de-energized. In response to determining the appliance is de-energized, the method may include using the security system 202 to actuate the appliance. As well, even if the security system 202 determines that the appliance is currently energized, the security system 202 may determine whether the appliance is configured as per the appliance record of the inside visitor 550. In response to determining that the appliance is not configured as per the settings of the second appliance record of the inside visitor 550, the method may include using the security system 202 to actuate the appliance as per the settings of the first appliance record.

The first appliance record may include at least a first predetermined appliance setting, and the second appliance record may include at least a second predetermined appliance setting. As such, embodiments may include using the security system 202 to determine whether the first predetermined appliance setting is ranked higher than the second predetermined appliance setting, and vice versa. To further illustrate, if the appliance is the television 514, the method may include using the security system 202 to energize the television 514. Furthermore, the method may include using the security system 202 to configure the television 514 to receive a signal from a predetermined television channel as per the first or second predetermined appliance setting. Moreover, the method may include using the security system 202 to configure the television 514 to a predetermined volume as per the first or second predetermined appliance setting.

Figure 12:
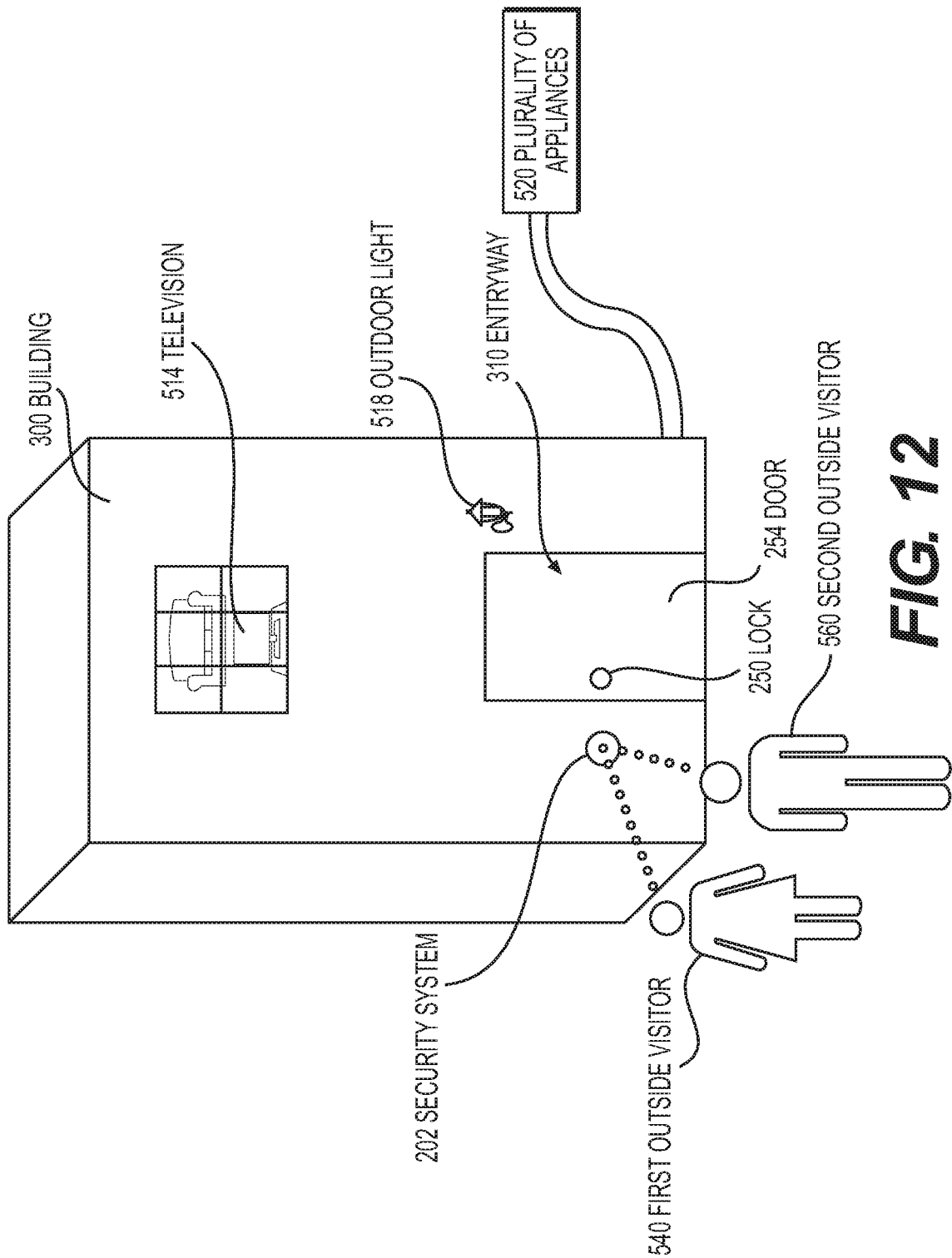
Figure 13:
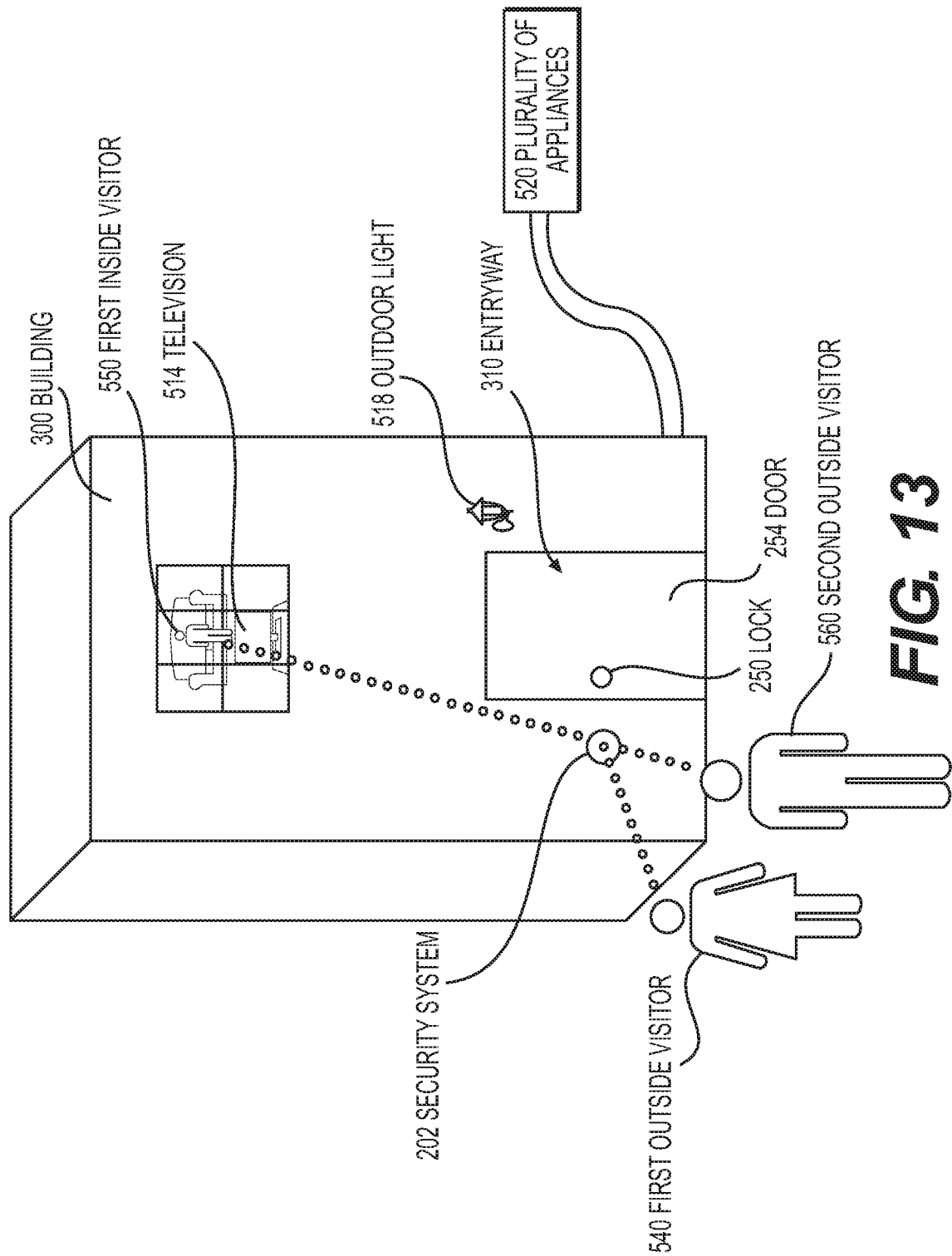

With respect to FIGS. 6 and 12, the disclosure includes methods for using a security system 202 to detect an indication of a presence of a first outside visitor 540 and a presence of a second outside visitor 560. In this regard, the method may include using the security system 202 to detect the indication of the presence of the first outside visitor 540 while the first outside visitor 540 is located outside the building 300 to which the security system 202 is attached (at step 2008). In response to detecting the presence of the first outside visitor 540, the method may include using the security system 202 to detect the presence of the second outside visitor 560 while the second outside visitor 560 is located outside the building 300 (at step 2010).

Accordingly, many embodiments include using the security system 202 to determine whether the first outside visitor 540 is a first resident, first known guest, or first unknown guest. As well, many embodiments include using the security system 202 to determine whether the second outside visitor 560 is a second resident, second known guest, or second unknown guest.

Additionally, a first appliance record may be associated with the first outside visitor 540 and a second appliance record may be associated with the second outside visitor 560. Accordingly, in response to determining the first outside visitor 540 is the first resident and the second outside visitor 560 is the second resident, the method may further include using the security system 202 to determine whether the first appliance record is ranked higher than the second appliance record. For example, in response to determining the first appliance record is ranked higher than the second appliance record, the method may include using the security system 202 to actuate and configure a plurality of appliances 520 as per the first appliance record. As well, in response to determining the second appliance record is ranked higher than the first appliance record, the method may include using the security system 202 to actuate and configure a plurality of appliances 520 as per the second appliance record.

Figure 14:
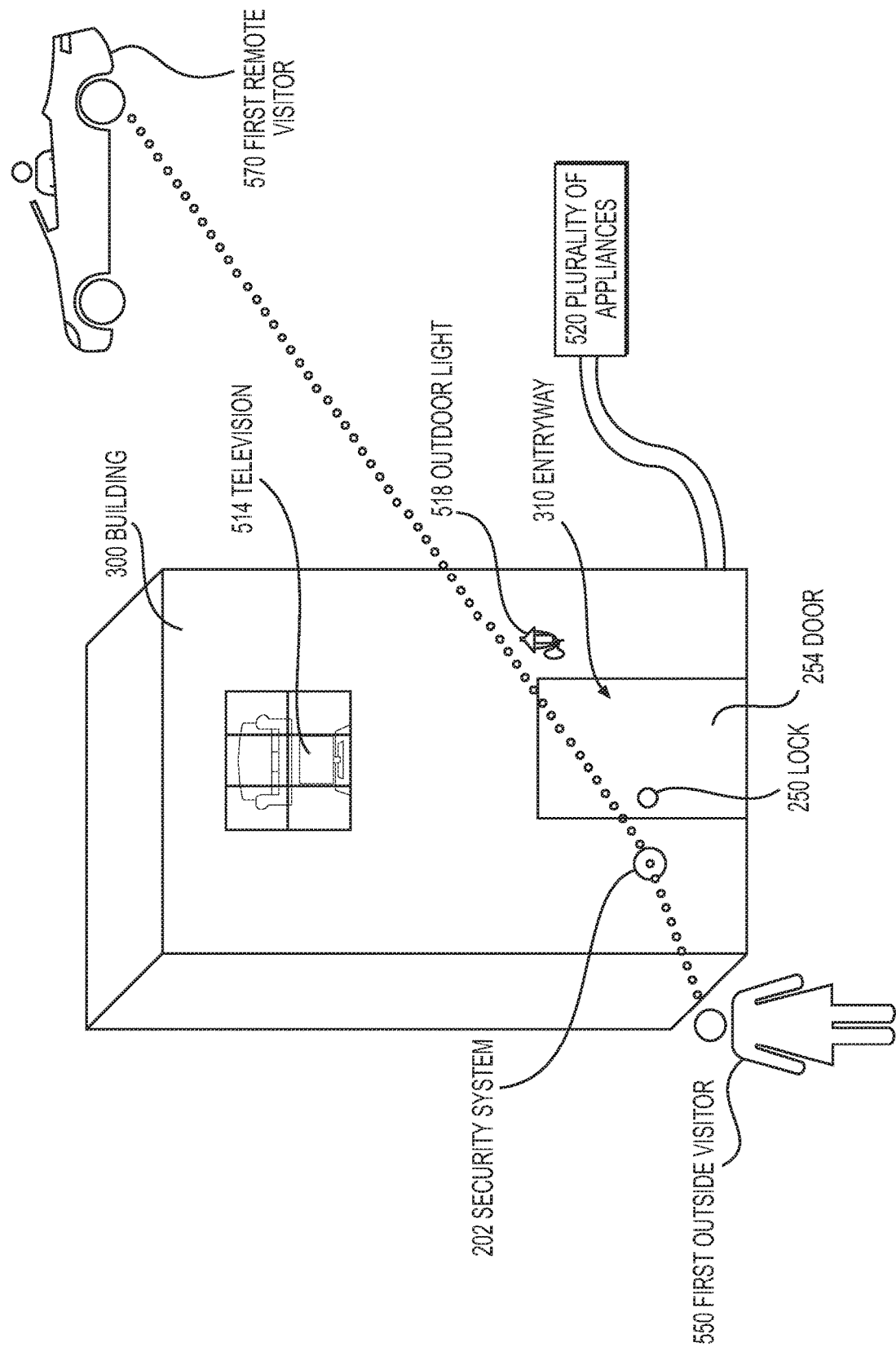

Now referring to FIG. 14, in addition to detecting multiple outside visitors, the method may also include using the security system 202 to detect the presence of an inside visitor 550 while the inside visitor 550 is located inside of the building 300. Accordingly, the method may further include using the security system 202 to determine whether each the of the first outside visitor 540, second outside visitor 560, and inside visitor 550 is a resident, known guest, or unknown guest, respectively.

The method may include performing different steps according to the various combinations of visitor types (i.e. resident(s), known guest(s), and/or unknown guest(s)) of the first and second outside visitors 540 and 560 and the inside visitor 550. In the event that all visitors are of the same type, such as all visitors are residents, all visitors are known guests, or all visitors are unknown guests of the building 300, the method may determine a priority ranking of the visitors and actuate appliances as detailed within the appliance records of the visitors, as based upon their rankings with respect to each other. Additionally, many embodiments may access the appliance records of the visitors and determine how each visitor has prioritized her appliances. For example, some visitors might prioritize the television 514 as their top appliance, while the temperature of the building 300 is further down the priority list. Accordingly, the security system 202 may actuate appliances as based upon the individual priority rankings.

In some embodiments, the method may actuate appliances based upon which appliances that are currently energized or de-energized, which may indicate that the inside visitor 550 is currently not using them. For example, in response to determining that either the first outside visitor 540 is a first resident or the second outside visitor 560 is a second resident, and in response to determining the inside visitor 550 is a third resident, the method may include using the security system 202 to determine whether a first appliance associated with an appliance record of the first resident or a second appliance associated with an appliance record of the second resident is de-energized. In response to determining the first appliance associated with the appliance record of the first outside visitor 540 or second appliance associated with the appliance record of the second outside visitor 560 is de-energized, the method may include using the security system 202 to actuate and configure the first appliance as per the appliance record of the first outside visitor 540 or the second appliance as per the appliance record of the second outside visitor 560.

Detecting Remote Visitors

Many embodiments may also include methods for using a security system 202 to detect visitors who are located remotely from the building 300. With reference to FIGS. 7 and 14-15, some embodiments may include using the security system 202 to detect the presence of the first visitor 540 while the first visitor 540 is located outside a building 300 to which the security system is attached (at step 2012). In response to detecting the presence of the first visitor 540, the method may also include using the security system 202 to detect an indication of a location of the second visitor 570 with respect to the building 300, wherein the second visitor 570 is located remotely from the building 300 (at step 2014).

In many embodiments, the security system 202 may locate a remote computing device 204, such as a smartphone. Upon locating the remote computing device 204, the security system 202 may determine the distance of the remote computing device 204 from the building 300. As such, the location of the remote computing device 204 may serve as an indication of a location of the second visitor 570.

The security system 202 may initiate different events in response to the indication of the second visitor's location from the building 300. For example, in response to detecting the indication of the location of the second visitor 570 is greater than a predetermined distance from the building 300, the method may further include actuating at least one appliance as per a first appliance record associated with the first visitor 540. In other words, because the second visitor 570 is greater than the predetermined distance from the building 300, this may be an indication that the second visitor 570 is not in the general vicinity of the building 300. As well, it should be appreciated that the predetermined distance may be any distance, such as less than or equal: 100 feet, 1000 feet, 0.5 miles, 1 mile, 2 miles, 5 miles, or any suitable distance that may indicate that the second visitor 570 is located in a general vicinity of the building 300.

At times the indication of the second visitor's location may be less than the predetermined distance from the building 300, which may indicate that the second visitor 570 is located within the general vicinity of the building 300. In such event, the security system 202 may execute an algorithm or set of instructions to determine whose appliances to actuate such as, the appliances as detailed on the first appliance record of the first visitor 540, or the appliances as detailed on the second appliance record of the second visitor 570.

For example, in response to detecting the indication of the location of the second visitor 570 is less than the predetermined distance from the building 300, the method may include using the security system 202 to determine whether the second appliance record is ranked higher than the first appliance record. In response to determining the first appliance record is ranked higher than the second appliance record, the method may include using the security system 202 to actuate all appliances as per the first appliance record.

Many embodiments may also be configured to determine whether indications of locations of at least two remote visitors (such as a third resident, fourth resident, etc., whereby the third resident, fourth resident, etc. are remotely located with respect to the building 300) are less than or greater than the predetermined distance from the building 300. For example, in response to detecting that the indication of the location of the second visitor 570 is less than one mile from the building 300, the method may also include using the security system 202 to detect whether an indication of a location of a third visitor 580 is less than the predetermined distance from the building 300, wherein the third visitor 580 is located remotely from the building 300. In response to detecting the indication of the location of the third visitor 580 is less than the predetermined distance from the building 300, the method may also include using the security system 202 to determine whether the first appliance record, second appliance record, or a third appliance record associated with the third visitor 580 is ranked highest.

Embodiments may perform different operations in response to determining whose appliance record is ranked highest. For example, in response to determining the first appliance record is ranked higher than the second and third appliance records, methods may include using the security system 202 to actuate all appliances as per the first appliance record. As well, in response to determining the second appliance record is ranked higher than the first and third appliance records, methods may include using the security system 202 to actuate all appliances as per the second appliance record. Furthermore, in response to determining the third appliance record is ranked higher than the first and second appliance records, methods may include using the security system to actuate all appliances as per the third appliance record.

In addition to determining whether the indication of the second visitor's location is within the general vicinity of the building 300, many embodiments may include using the security system 202 to determine whether the indication of the second visitor's location is moving towards or away from the building 300. For example, in response to determining the second visitor 570 is moving towards the building 300 and in response to determining the second appliance record is ranked higher than the first appliance record, the method may include using the security system 202 to actuate all appliances as per the second appliance record. Furthermore, in response to determining the second visitor 570 is not moving towards the building 300 (i.e. the second visitor 570 is moving away from the building 300 or the second visitor 570 is not moving), the method may include using the security system 202 to actuate all appliances as per the first appliance record.

As well, it should be appreciated that the determination of whether the indication of the second visitor's location is moving towards or away from the building 300 may be accomplished via any type of location tracking technology, such as GPS, cellular triangulation, crowd-sourced Wi-Fi, or the like.

The situation may arise whereby the indication of the location of the second visitor 570 is less than the predetermined distance from the building 300, but the security system 202 does not actuate the appliances associated with the second appliance record because the indication of the second visitor's location is moving away from the building 300 or the indication of the second visitor's location is not moving. In response to determining the indication of the location of the second visitor 570 is less than the predetermined distance from the building 300, and in response to determining the indication of the location of the second visitor 570 is moving away from the building 300 or the indication of the second visitor's location is not moving, the method may include using the security system 202 to actuate the appliances as per the first appliance record.

Embodiments may also be configured to determine the direction of movement of at least two visitors (such as the third resident, fourth resident, etc.) who are remotely located with respect to the building 300. For example, in response to detecting that the indication of the location of the second visitor 570 is less than the predetermined distance from the building 300, the method may include using the security system 202 to detect whether an indication of a location of a third visitor 580 is less than the predetermined distance from the building 300. Accordingly, in response to detecting the indication of the location of the third visitor 580 is less than the predetermined distance from the building 300, the method may also include using the security system 202 to determine whether the second visitor 570 is moving towards the building 300, and using the security system 202 to determine whether the third visitor 580 is moving towards the building 300.

In response to determining the second and third visitors 570 and 580 are moving towards the building 300, the method may further include using the security system 202 to determine whether the first appliance record, second appliance record, or third appliance record is ranked highest. In response to determining the first appliance record is ranked higher than the second and third appliance records, the method may include using the security system 202 to actuate all appliances as per the first appliance record. As such, in response to determining the second appliance record is ranked higher than the first and third appliance records, the method may include using the security system 202 to actuate all appliances as per the second appliance record. As well, in response to determining the third appliance record is ranked higher than the first and second appliance records, the method may include using the security system 202 to actuate all appliances as per the third appliance record.

Alternatively, in response to determining the second visitor 570 is moving towards the building 300 and the third visitor 580 is not moving towards the building 300, the method may further include using the security system 202 to determine whether the first appliance record or the second appliance record is ranked highest. Accordingly, in response to determining the first appliance record is ranked higher than the second appliance record, the method may include using the security system 202 to actuate all appliances as per the first appliance record. As such, in response to determining the second appliance record is ranked higher than the first appliance record, the method may include using the security system 202 to actuate all appliances as per the second appliance record.

Moreover, in response to determining the third visitor 580 is moving towards the building 300 and the second visitor 570 is not moving towards the building 300, the method may include using the security system 202 to determine whether the first appliance record or the third appliance record is ranked highest. In response to determining the first appliance record is ranked higher than the third appliance record, the method may include using the security system 202 to actuate all appliances as per the first appliance record. In response to determining the third appliance record is ranked higher than the first appliance record, the method may also include using the security system 202 to actuate all appliances as per the third appliance record.

As such, in response to determining the second and third visitors 570 and 580 are not moving towards the building 300, the method may include using the security system 202 to actuate all appliances as per the first appliance record.

Furthermore, as illustrated in FIG. 15, in addition to detecting the first outside visitor 540, first inside visitor 550, second outside visitor 560, first remote visitor 570, and second remote visitor 580, many embodiments also include detecting a second inside visitor 590. These embodiments may also include any of the logic previously described in regards to determining which appliances to actuate and how the appliances should be configured. As well, it should generally be appreciated that embodiments of the security system 202 may be configured to detect any number of visitors, such as a third outside visitor, a third remote visitor, a third inside visitor, etc. and thereby use any of the logic previously described to determine which appliances to actuate and how the appliances should be configured.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method for using a doorbell system to detect a presence of an outside visitor and a presence of an inside visitor, the doorbell system comprising a doorbell having a housing, a speaker, a microphone, a camera, a diagnostic light, a power indicator light, a motion detector, and a button, wherein the button is configurable to enable the outside visitor to sound a chime, the method comprising:

detecting, by the doorbell system, the presence of the outside visitor while the outside visitor is located outside a building to which the doorbell is attached, wherein the building comprises a door having a lock configured to fasten the door to inhibit unauthorized entry into the building;

in response to detecting the presence of the outside visitor, detecting, by the doorbell system, the presence of the inside visitor while the inside visitor is located inside of the building; determining, by the doorbell system, whether the outside visitor is a first resident, first known guest, or first unknown guest;

determining, by the doorbell system, whether the inside visitor is a second resident, second known guest, or second unknown guest;

in response to determining the outside visitor is the first resident and the inside visitor is the second resident;
      determining, by the doorbell system, whether a first appliance record associated with the outside visitor is ranked equally with a second appliance record associated with the inside visitor; and
      in response to determining the first appliance record associated with the outside visitor is ranked equally with the second appliance record associated with the inside visitor, comparing, by the doorbell system, the first appliance record and the second appliance record; and
   in response to determining that the first appliance record associated with the outside visitor is ranked equally with the second appliance record associated with the inside visitor,
      determining, by the doorbell system, whether a first appliance of the first appliance record is defined in the second appliance record;
      in response to determining that the first appliance of the first appliance record is defined in the second appliance record, comparing a ranking of the first appliance on the first appliance record and a ranking of the first appliance on the second appliance record; and
      in response to determining that the first appliance has a higher ranking on the first appliance record than on the second appliance record, actuating, by the doorbell system, the first appliance as per at least one preference defined in the first appliance record.

2. The method of claim 1,
   wherein the first resident or second resident is authorized access to the building any time of day, wherein the first known guest or second known guest is authorized access to the building at a predetermined time of day, and wherein the first unknown guest or second unknown guest is not authorized access to the building.

3. The method of claim 2, in response to determining, by the doorbell system, the outside visitor is the first resident and the inside visitor is the second known guest or second unknown guest, the method further comprising actuating, by the doorbell system, at least one selected appliance from an appliance record associated with the outside visitor.

4. The method of claim 2, in response to determining the outside visitor is the first resident and the inside visitor is the second resident, the method further comprising:
   determining, by the doorbell system, whether a first appliance record associated with the outside visitor is ranked higher than a second appliance record associated with the inside visitor; and
   in response to determining the first appliance record associated with the outside visitor is ranked higher than the second appliance record associated with the inside visitor, actuating, by the doorbell system, at least one appliance from the first appliance record.

5. The method of claim 2, wherein a first appliance record is associated with the outside visitor and a second appliance record is associated with the inside visitor, and wherein in response to determining the outside visitor is the first resident and the inside visitor is the second resident, the method further comprising:
   determining, by the doorbell system, whether a first appliance of the first appliance record is not defined in the second appliance record;
   in response to determining the first appliance of the first appliance record is not defined in the second appliance record, actuating, by the doorbell system, the first appliance;
   determining, by the doorbell system, whether a second appliance of the first appliance record is defined in the second appliance record;
   in response to determining the second appliance of the first appliance record is defined in the second appliance record, determining, by the doorbell system, whether the second appliance is de-energized; and
   in response to determining the second appliance is de-energized, actuating, by the doorbell system, the second appliance.

6. The method of claim 5, wherein the first appliance record includes at least a first predetermined appliance setting, wherein the second appliance is a television, and wherein actuating, by the doorbell system, the second appliance comprises:
   energizing, by the doorbell system, the television;
   configuring, by the doorbell system, the television to receive a signal from a predetermined television channel as per the first predetermined appliance setting; and
   configuring, by the doorbell system, the television to a predetermined volume as per the first predetermined appliance setting.

7. The method of claim 5, wherein the first appliance record includes at least a first predetermined appliance setting, and wherein in response to determining the second appliance is energized, the method further comprising:
   determining, by the doorbell system, whether the first appliance record is ranked higher than the second appliance record; and
   in response to determining the first appliance record is ranked higher than the second appliance record, configuring, by the doorbell system, the second appliance as per the first predetermined appliance setting.

8. The method of claim 5, wherein the first appliance record includes at least a first predetermined appliance setting and the second appliance record includes at least a second predetermined appliance setting, and wherein in response to determining the second appliance is energized, the method further comprising:
   determining, by the doorbell system, whether the first predetermined appliance setting is ranked higher than the second predetermined appliance setting; and in response to determining the first predetermined appliance setting is ranked higher than the second predetermined appliance setting, configuring, by the doorbell system, the second appliance as per the second predetermined appliance setting.

9. The method of claim 5, wherein the first appliance and the second appliance are each selected from the group consisting of air conditioning, heating, lighting, television, and ventilation.

10. The method of claim 1, in response to determining that the first appliance record associated with the outside visitor is ranked equally with the second appliance record associated with the inside visitor, the method comprising:
determining, by the doorbell system, whether a first appliance of the first appliance record is not defined in the second appliance record; and
in response to determining the first appliance of the first appliance record is not defined in the second appliance record, actuating, by the doorbell system, the first appliance.

11. A method for using a doorbell system to detect a presence of an outside visitor and a presence of an inside visitor, the doorbell system comprising a doorbell having a housing, a speaker, a microphone, a camera, a diagnostic light, a power indicator light, a motion detector, and a button, wherein the button is configurable to enable the outside visitor to sound a chime, the method comprising:
detecting, by the doorbell system, the presence of the outside visitor while the outside visitor is located outside a building to which the doorbell is attached, wherein the building comprises a door having a lock configured to fasten the door to inhibit unauthorized entry into the building;
in response to detecting the presence of the outside visitor, detecting, by the doorbell system, the presence of the inside visitor while the inside visitor is located inside of the building;
determining, by the doorbell system, whether the outside visitor is a first resident, first known guest, or first unknown guest;
determining, by the doorbell system, whether the inside visitor is a second resident, second known guest, or second unknown guest;
in response to determining the outside visitor is the first resident and the inside visitor is the second resident;
determining, by the doorbell system, whether a first appliance record associated with the outside visitor is ranked equally with a second appliance record associated with the inside visitor; and
in response to determining the first appliance record associated with the outside visitor is ranked equally with the second appliance record associated with the inside visitor, comparing, by the doorbell system, the first appliance record and the second appliance record; and
in response to determining that the first appliance record associated with the outside visitor is ranked equally with the second appliance record associated with the inside visitor,
determining, by the doorbell system, whether a first appliance of the first appliance record is defined in the second appliance record;
in response to determining that the first appliance of the first appliance record is defined in the second appliance record, comparing a ranking of the first appliance on the first appliance record and a ranking of the first appliance on the second appliance record; and
in response to determining that the first appliance has a higher ranking on the second appliance record than on the first appliance record, actuating, by the doorbell system, the first appliance as per at least one preference defined in the second appliance record.

12. The method of claim 11, wherein the first resident or second resident is authorized access to the building any time of day, wherein the first known guest or second known guest is authorized access to the building at a predetermined time of day, and wherein the first unknown guest or second unknown guest is not authorized access to the building.

13. The method of claim 12, in response to determining, by the doorbell system, the outside visitor is the first resident and the inside visitor is the second known guest or second unknown guest, the method further comprising actuating, by the doorbell system, at least one selected appliance from an appliance record associated with the outside visitor.

14. The method of claim 12, in response to determining the outside visitor is the first resident and the inside visitor is the second resident, the method further comprising:
determining, by the doorbell system, whether a first appliance record associated with the outside visitor is ranked higher than a second appliance record associated with the inside visitor; and
in response to determining the first appliance record associated with the outside visitor is ranked higher than the second appliance record associated with the inside visitor, actuating, by the doorbell system, at least one appliance from the first appliance record.

15. The method of claim 12, wherein a first appliance record is associated with the outside visitor and a second appliance record is associated with the inside visitor, and wherein in response to determining the outside visitor is the first resident and the inside visitor is the second resident, the method further comprising:
determining, by the doorbell system, whether a first appliance of the first appliance record is not defined in the second appliance record;
in response to determining the first appliance of the first appliance record is not defined in the second appliance record, actuating, by the doorbell system, the first appliance;
determining, by the doorbell system, whether a second appliance of the first appliance record is defined in the second appliance record;
in response to determining the second appliance of the first appliance record is defined in the second appliance record, determining, by the doorbell system, whether the second appliance is de-energized; and
in response to determining the second appliance is de-energized, actuating, by the doorbell system, the second appliance.

16. The method of claim 15, wherein the first appliance record includes at least a first predetermined appliance setting, wherein the second appliance is a television, and wherein actuating, by the doorbell system, the second appliance comprises:
energizing, by the doorbell system, the television;
configuring, by the doorbell system, the television to receive a signal from a predetermined television channel as per the first predetermined appliance setting; and
configuring, by the doorbell system, the television to a predetermined volume as per the first predetermined appliance setting.

17. The method of claim 15, wherein the first appliance record includes at least a first predetermined appliance setting, and wherein in response to determining the second appliance is energized, the method further comprising:
   determining, by the doorbell system, whether the first appliance record is ranked higher than the second appliance record; and
   in response to determining the first appliance record is ranked higher than the second appliance record, configuring, by the doorbell system, the second appliance as per the first predetermined appliance setting.

18. The method of claim 15, wherein the first appliance record includes at least a first predetermined appliance setting and the second appliance record includes at least a second predetermined appliance setting, and wherein in response to determining the second appliance is energized, the method further comprising:
   determining, by the doorbell system, whether the first predetermined appliance setting is ranked higher than the second predetermined appliance setting; and
   in response to determining the first predetermined appliance setting is ranked higher than the second predetermined appliance setting, configuring, by the doorbell system, the second appliance as per the second predetermined appliance setting.

19. The method of claim 15, wherein the first appliance and the second appliance are each selected from the group consisting of air conditioning, heating, lighting, television, and ventilation.

20. The method of claim 11, in response to determining that the first appliance record associated with the outside visitor is ranked equally with the second appliance record associated with the inside visitor, the method comprising:
   determining, by the doorbell system, whether a first appliance of the first appliance record is not defined in the second appliance record; and
   in response to determining the first appliance of the first appliance record is not defined in the second appliance record, actuating, by the doorbell system, the first appliance.

* * * * *